United States Patent
Morita et al.

(10) Patent No.: US 10,044,976 B2
(45) Date of Patent: Aug. 7, 2018

(54) INFORMATION PROCESSING APPARATUS, IMAGE DISPLAY METHOD, AND COMMUNICATIONS SYSTEM

(71) Applicants: Kenichiro Morita, Tokyo (JP); Takuya Imai, Tokyo (JP); Shoh Nagamine, Kanagawa (JP)

(72) Inventors: Kenichiro Morita, Tokyo (JP); Takuya Imai, Tokyo (JP); Shoh Nagamine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/218,674

(22) Filed: Jul. 25, 2016

(65) Prior Publication Data

US 2017/0034477 A1 Feb. 2, 2017

(30) Foreign Application Priority Data

Jul. 28, 2015 (JP) .................. 2015-148655

(51) Int. Cl.
*H04N 7/14* (2006.01)
*H04N 7/15* (2006.01)

(52) U.S. Cl.
CPC ............... *H04N 7/147* (2013.01); *H04N 7/15* (2013.01)

(58) Field of Classification Search
CPC ...................................... H04N 7/11
USPC ............................................ 348/14.1–14.09
See application file for complete search history.

(56) References Cited

U.S. PATENT DOCUMENTS

| 6,128,649 A | 10/2000 | Smith et al. |
| 8,487,956 B2 | 7/2013 | Morita et al. |
| 8,769,001 B2 | 7/2014 | Ohwada |
| 9,374,556 B2 | 6/2016 | Nagamine et al. |
| 2005/0099492 A1* | 5/2005 | Orr ............... H04L 12/1827 348/14.08 |
| 2007/0211141 A1* | 9/2007 | Christiansen ..... H04L 29/06027 348/14.08 |

(Continued)

FOREIGN PATENT DOCUMENTS

| JP | 2002-501710 | 1/2002 |
| JP | 2011-205612 | 10/2011 |

(Continued)

OTHER PUBLICATIONS

Extended European Search Report dated Jan. 4, 2017 in Patent Application No. 16181025.4.

*Primary Examiner* — Maria El-Zoobi
(74) *Attorney, Agent, or Firm* — Oblon, McClelland, Maier & Neustadt, L.L.P.

(57) ABSTRACT

An information processing apparatus to display video data on a display apparatus includes a receiver to receive the video data from one or more other information processing apparatuses via a network, a video data determiner to determine the video data to be received by the receiver according to a communications status, a static image data storage to acquire static image data from the one or more other information processing apparatuses to store the acquired static image data, and a display processor to generate a screen having one or more areas to display the video data determined by the video data determiner in the areas. The display processor displays the static image data stored in the static image data storage in the areas when a determined number of the video data is less than a number of the areas.

8 Claims, 16 Drawing Sheets

(56) References Cited

U.S. PATENT DOCUMENTS

| | | |
|---|---|---|
| 2011/0292161 A1 | 12/2011 | Sharon et al. |
| 2012/0201255 A1* | 8/2012 | Manor ............... H04N 21/2385 370/468 |
| 2012/0284409 A1 | 11/2012 | Lee et al. |
| 2013/0191479 A1* | 7/2013 | Gottlieb ................... H04N 7/15 709/206 |
| 2014/0118475 A1 | 5/2014 | Nagamine et al. |
| 2016/0094594 A1 | 3/2016 | Imai et al. |
| 2016/0094595 A1 | 3/2016 | Shiro et al. |

FOREIGN PATENT DOCUMENTS

| | | |
|---|---|---|
| JP | 4905929 | 3/2012 |
| JP | 2012-085014 | 4/2012 |
| JP | 4994646 | 8/2012 |
| JP | 2013-531934 | 8/2013 |
| JP | 2014-090387 | 5/2014 |
| JP | 2016-072969 | 5/2016 |
| JP | 2016-072970 | 5/2016 |
| JP | 2016-111684 | 6/2016 |
| WO | WO 2009/018665 A1 | 2/2009 |
| WO | WO 2014/208569 A1 | 12/2014 |

\* cited by examiner

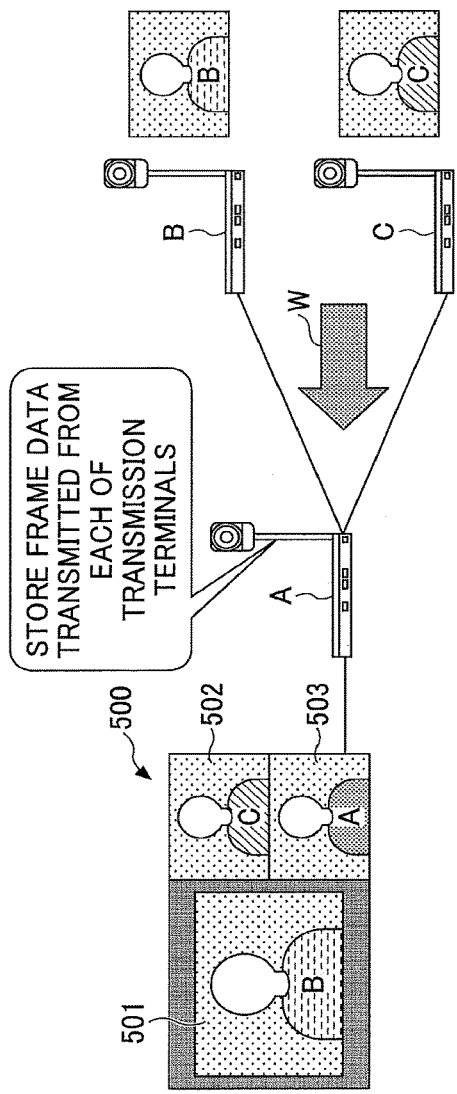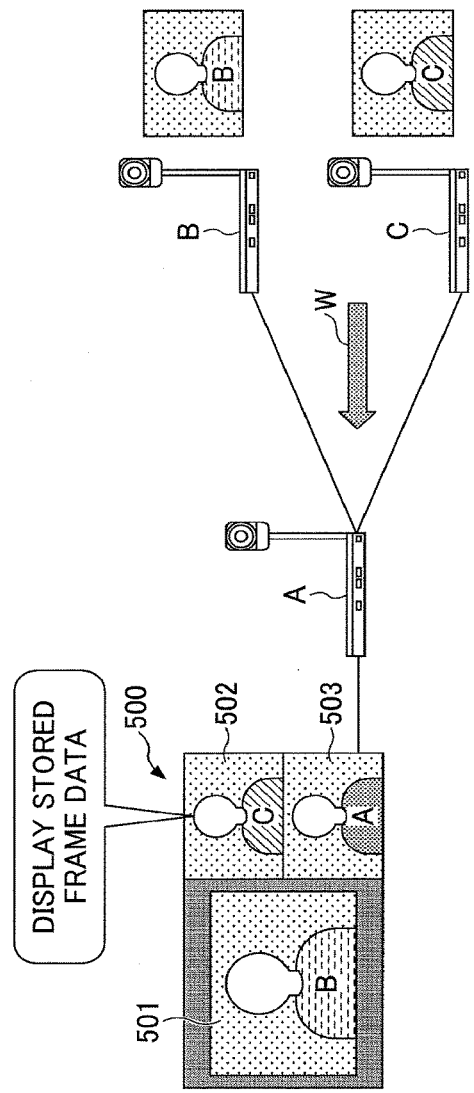
FIG.2A
FIG.2B

INFORMATION PROCESSING APPARATUS, IMAGE DISPLAY METHOD, AND COMMUNICATIONS SYSTEM

CROSS-REFERENCE TO RELATED APPLICATIONS

The present application is based upon and claims the benefit of priority of the Japanese Priority Application No. 2015-148655 filed on Jul. 28, 2015, the entire contents of which are hereby incorporated herein by reference.

BACKGROUND OF THE INVENTION

1. Field of the Invention

The present disclosure relates to an information processing apparatus, an image display method, and a communications system.

2. Description of the Related Art

Videoconferencing systems or television (TV) conference systems are known in the art as examples of transmission systems to conduct television conferences between multiple terminals via communications networks such as the Internet. In such a TV conference system, image data and audio data collected at one end by a transmission terminal during the TV conference are transmitted to the other end to be received by another transmission terminal. The other end transmission terminal receives the image data and audio data to display the received data on a display or the like as well as outputting sound or voice from a speaker, enabling the transmission terminals to hold the TV conference.

However, data transmission rates via the Internet vary and data transmission delays are not always constant, constantly fluctuating reception bandwidths of the image data and the audio data transmitted and received in the TV conference. The transmission terminals generally incorporate a media control technology to facilitate conversations in unstable reception bandwidths. The media control technology may control the transmission terminals to preferentially receive audio data and not to receive the image data when the reception bandwidths degrade. The number of sets of image data displayed on the transmission terminals will fluctuate; however, display or layout of the image data received from the other end by the transmission terminal depends on a receiving side of the transmission terminal.

Japanese Translation of PCT International Application Publication No. JP-T-2013-531934 (hereinafter called "Patent Document 1"), for example, proposes a technology to determine a layout of a screen displaying the image data received from multiple transmission terminals in accordance with conditions of the transmission terminal. Patent Document 1 discloses a video communications system for changing the layouts in accordance with changes in the system conditions of the transmission terminal.

RELATED ART DOCUMENT

Patent Document

Patent Document 1: Japanese Translation of PCT International Application Publication No. JP-T-2013-531934

SUMMARY OF THE INVENTION

According to an aspect of embodiments, there is provided an information processing apparatus for displaying video data on a display apparatus. The information processing apparatus includes a receiver configured to receive the video data from one or more other information processing apparatuses via a network; a video data determiner configured to determine the video data to be received by the receiver according to a communications status; a static image data storage configured to acquire static image data from the one or more other information processing apparatuses to store the acquired static image data; and a display processor configured to generate a screen having one or more areas to display the video data determined by the video data determiner in the generated areas of the screen. In a case where a number of the video data that the video data determiner has determined to receive is less than a number of the areas of the screen, the display processor displays the static image data in the areas of the screen, the static image data being stored in the static image data storage.

Other objects, features and advantages of the present invention will become more apparent from the following detailed description when read in conjunction with the accompanying drawings.

BRIEF DESCRIPTION OF THE DRAWINGS

FIGS. 2A to 2C are schematic diagrams illustrating examples of transmission and reception of images and sound in a transmission system according to an embodiment;

DETAILED DESCRIPTION OF THE PREFERRED EMBODIMENTS

It is desirable to provide an information processing apparatus, an image display method, and a communications system capable of controlling frequent switching of the layout of a screen.

The following describes embodiments of the present invention with reference to the accompanying drawings.

Figure 1A:
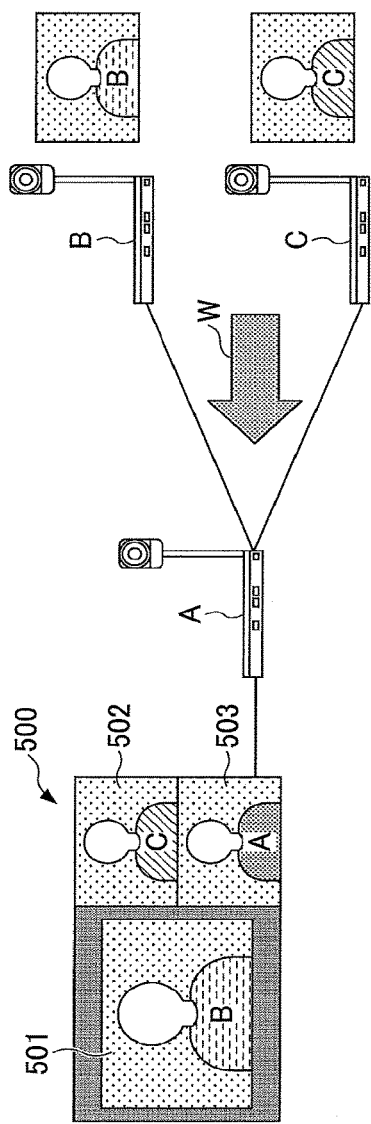
FIGS. 1A and 1B are diagrams illustrating examples of a number of areas in a conference screen of a transmission terminal according to an embodiment.
Figure 1B:
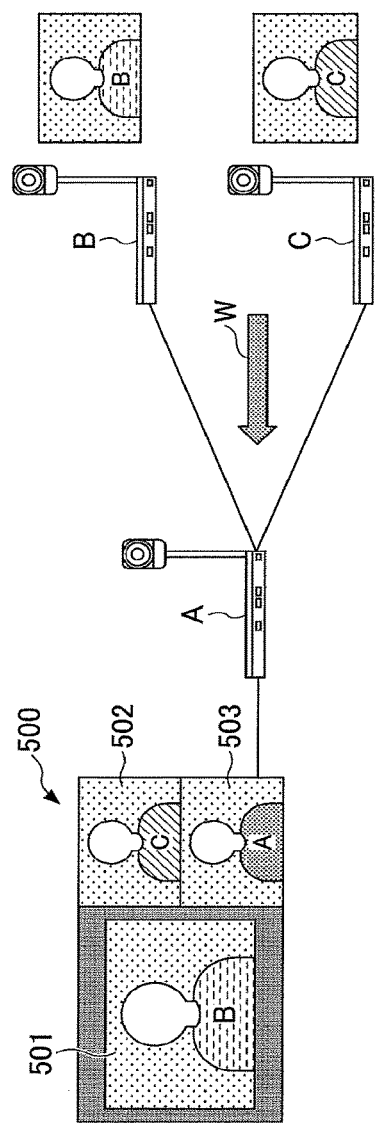

Initially a description is given, with reference to FIGS. 1A and 1B, of the number of areas included in a conference screen 500 according to an embodiment. A transmission terminal A performs a TV-conference with transmission terminals B and C. Places in which the transmission terminals A to C are disposed may be referred to as locations, indicating terminal locations. The following description is given based on the assumption that the number of locations is equal to the number of transmission terminals for convenience of explanation.

The number of areas and arrangement of the areas of the conference screen 500 in the transmission terminal A are determined based, for example, on the number of transmission terminals attending a conference, the size (resolution) of a display 120, the layout set by a user, and the like. In FIGS. 1A and 1B, three locations are displayed in the areas 501 to 503. The displays coupled to the transmission terminals A to C generally have a predetermined size. The number of areas and the arrangement of the areas of the conference screen 500 may thus depend on the number of attending transmission terminals alone if the user does not change the layout.

The number of areas and the arrangement of the areas of the conference screen 500 are predetermined regardless of conditions of network bandwidth or the number of received image data according to the network bandwidth W. FIG. 1A an example of the conference screen 500 of the transmission terminal A in a case where the network bandwidth W is sufficiently broad, whereas FIG. 1B illustrates an example of the conference screen 500C of the transmission terminal A in a case the network bandwidth W is reduced. In this embodiment, when the network bandwidth W is degraded, the number of areas of the conference screen 500 remains three.

Figure 2C:
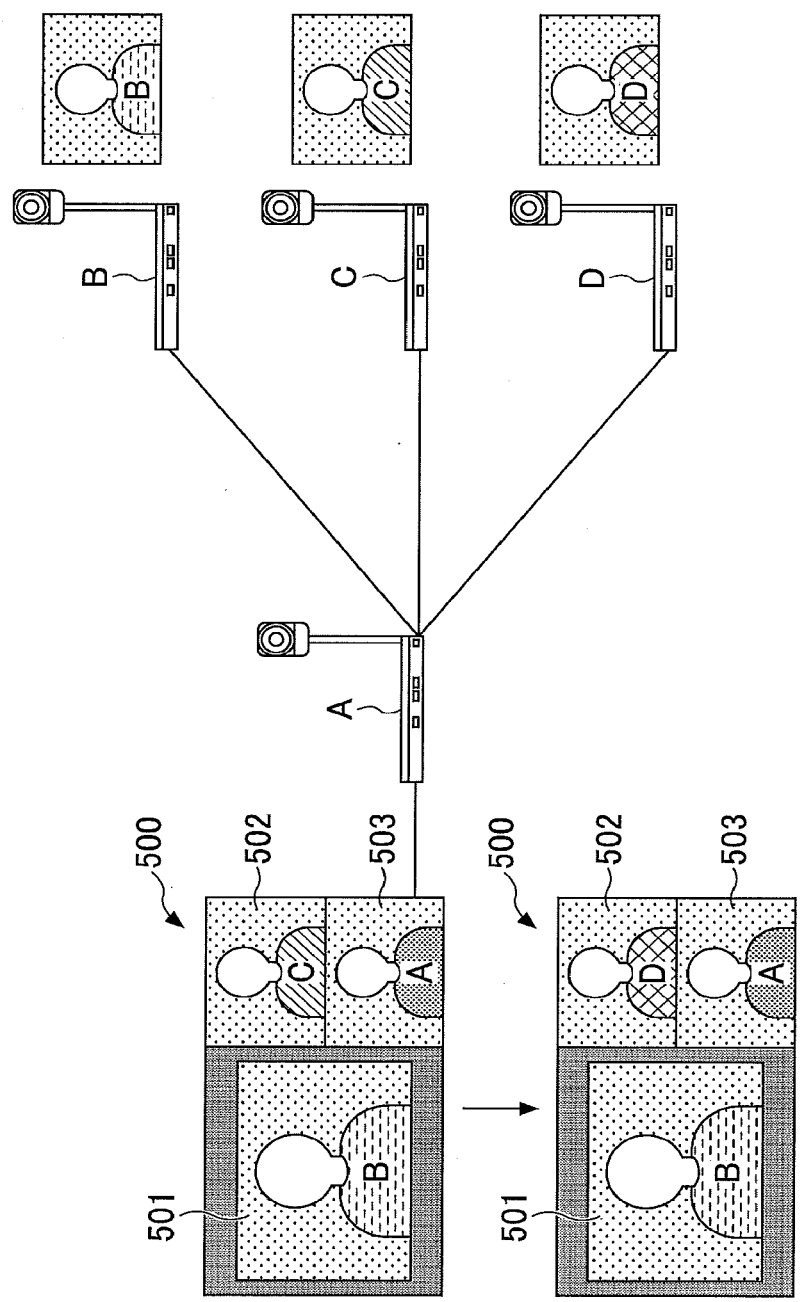

FIGS. 2A to 2C are schematic diagrams illustrating examples of the conference screen 500 according to an embodiment. FIG. 2A illustrates a status in which the transmission terminal A secures a reception bandwidth necessary for receiving image data (videos) from two locations. In this status, the transmission terminal A periodically stores frame data (static image data) that are static images of the image data received from the transmission terminals B and C.

FIG. 2B illustrates a status in which the transmission terminal A fails to secure the reception bandwidth necessary for receiving image data (videos) from the two locations. Since the narrowed reception bandwidth is likely to fail to receive image data (videos), a related art transmission terminal generally changes a layout of the conference screen 500 in accordance with the number of displaying image data (videos). The transmission terminal A according to the embodiment displays the frame data in the same layout stored at the reception of the image data (videos). Since the layout of the conference screen 500 will not be changed frequently, the transmission terminal A according to the embodiment may control the display of the conference screen 500 to allow the users to feel less annoyed.

FIG. 2C illustrates the transmission terminal A that displays image data of the transmission terminals B, C, and A (own location) among the four transmission terminals A to D. The transmission terminal A displays the image data of the transmission terminals B and C because the user sets the transmission terminal A to display the image data of the transmission terminals B and C or the transmission terminal A has settings of priorities of the transmission terminals B and C higher than priority of the transmission terminal D. The transmission terminal A received frame data from the terminals (locations) B to D and stores the frame data in this condition.

The reception bandwidth may be reduced, allowing the transmission terminal A to receive the image data (video) only from one transmission terminal B. Simultaneously, the priority of the transmission terminal D may become higher than the priority of the transmission terminal C. However, the transmission terminal A has already received the frame data from the transmission terminal D, and the transmission terminal A may thus be able to display the frame data of the transmission terminal D in the area of the conference screen 500.

As described above, in the image display method implemented by the transmission system 1 according to the embodiment, the transmission terminal A has received the frame data of the transmission terminal D, from which the transmission terminal A has not received the image data (video). Accordingly, when the transmission terminal A displays the image data of the transmission terminal D in the conference screen 500, the image data of the transmission terminal (location) D may be displayed with little delay.

System Configuration

Figure 3:
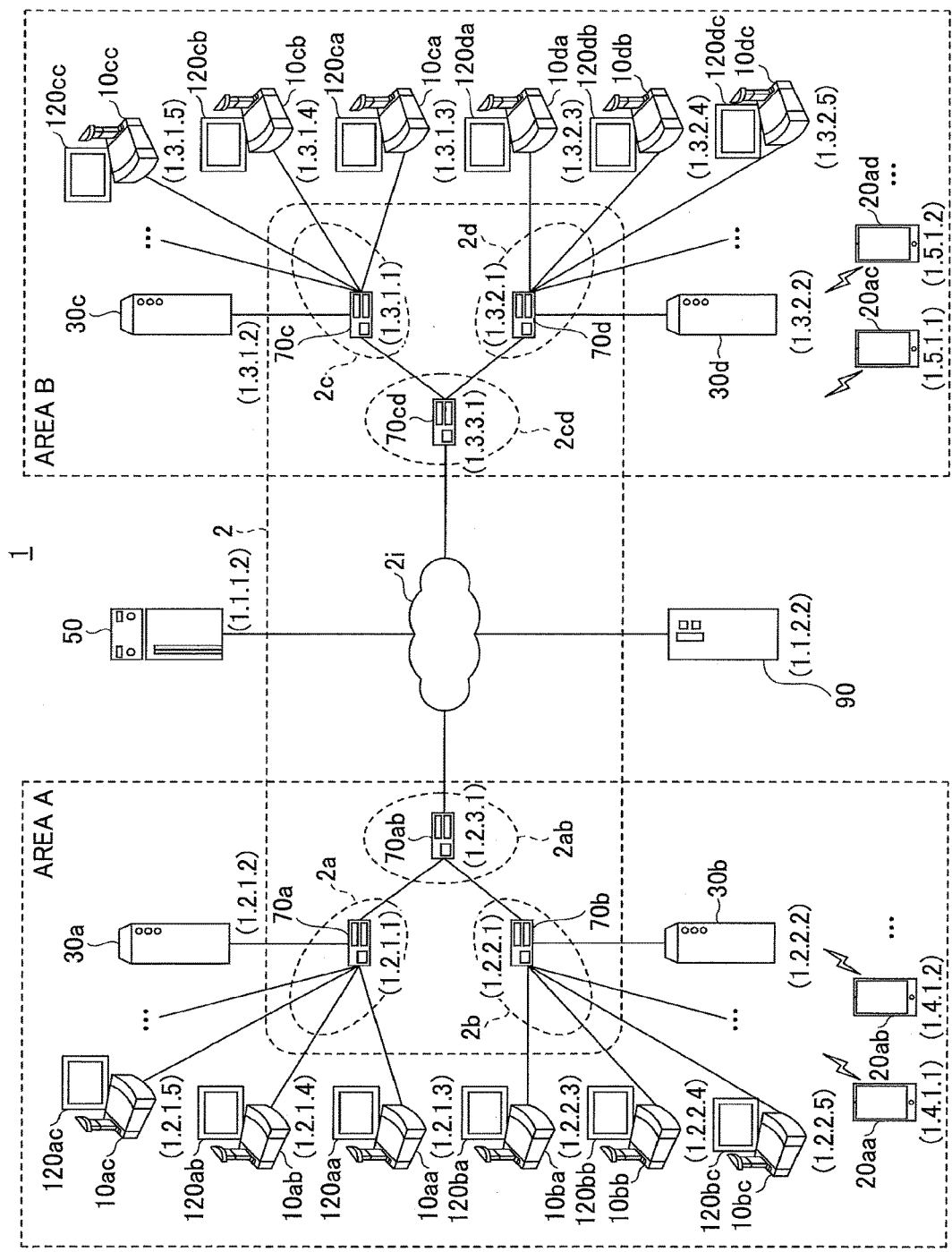
FIG. 3 is a schematic diagram illustrating the transmission system according to the embodiment.

FIG. 3 is a schematic diagram illustrating an example of a transmission system 1 according to an embodiment. The transmission system 1 (an example of a communications system) is a communication system configured to mutually propagate information, feelings, and the like between two or more transmission terminals via a transmission management system 50. Examples of the transmission system 1 include a TV conference system (a video conference system), a TV telephone system (a videophone system), an audio conference system, a voice call system, a personal computer (PC) screen-sharing system, and a text chat system. The transmission system 1 further includes a data providing system configured to transmit content data from a first transmission terminal to a second transmission terminal in a single direction via the transmission management system 50.

The following description is given on the basis of a system capable of conducting a TV conference (a TV conference system) as an example of the communications system.

The transmission system 1 illustrated in FIG. 3 includes two or more transmission terminals (10aa, 10ab, ...) two or more mobile terminals (20aa, 20ab, ...), respective displays (120aa, 120ab, ...) for the transmission terminals (10aa, 10ab, ...), two or more relay apparatuses (30a, 30b, ...), a transmission management system 50, $50_2$, ...), and a program providing system 90.

The transmission terminals 10 are configured to transmit or receive image data and sound data as an example of content data. An information display apparatus 40 is omitted. That is, the transmission terminals 10 are TV conference terminals capable of utilizing a TV conference service. In this embodiment, the transmission terminals 10 are TV conference-specific terminals.

The mobile terminals 20 are configured to transmit or receive image data and sound data as an example of content data. The mobile terminals 20 may also be configured to transmit or receive text data. That is, the mobile terminals 20 may utilize a text chat service in addition to the TV conference service. Unless otherwise specified in the embodiment, the mobile terminals 20 may be tablet terminals, mobile phones, smartphones, personal digital assistants (PDAs), wearable PCs, gaming apparatuses, general-purpose terminals, car-navigation terminals, electronic whiteboards, projectors, monitoring cameras, industrial apparatuses having communications functions, and the like. The industrial apparatuses include office apparatuses including multifunctional peripherals/printers/products (MFPs), medical instruments including an endoscope, and agricultural apparatuses including a cultivator. The wearable PCs include a watch and a head-mounted display. Note that the mobile terminals 20 may be wirelessly coupled to a communications network 2 via a mobile phone communications network or a wireless fidelity (WiFi), for example.

As is clear from the later-described hardware configurations, the transmission terminals 10 and the mobile terminals 20 are called information processing apparatuses.

The transmission terminals 10 and the mobile terminals 20 are managed by the transmission management system 50 configured to manage call control of the transmission system 1.

In the following, any one of the transmission terminals (10aa, 10ab, . . . ) may be referred to as a "transmission terminal 10", and any one of the mobile terminals (20aa, 20ab, . . . ) may be referred to as a "mobile terminal 20". The displays 120, the relay apparatuses 30, and the routers 70 are expressed in a similar manner.

One of the transmission terminal 10 and the mobile terminal 20 that transmits a request for starting a TV conference to the other one of the transmission terminal 10 and the mobile terminal 20 is represented by a "request source terminal", and the other one of the transmission terminal 10 and the mobile terminal 20 that receives the request from the request source terminal as a destination is represented by a "destination terminal".

In the transmission system 1, a management information session is established between the request source terminal and the destination terminal for transmitting and receiving various types of management information via the transmission management system 50. Further, a session for transmitting and receiving content data via the relay apparatus 30 is established between the request source terminal and the destination terminal. Note that in the session handling the content data, communications between the request source terminal and the destination terminal are not necessarily performed via the relay apparatus 30. The request source terminal and the destination terminal may perform communications via the transmission management system 50, or the request source terminal and the destination terminal may directly perform communications with each other.

The relay apparatus 30 is configured to relay the content data between the transmission terminals 10 and the mobile terminals 20.

The transmission management system 50 is configured to perform call control between the transmission terminals 10 and the mobile terminals 20. In addition, the transmission management system 50 performs login authentication of the transmission terminals 10 and the mobile terminals 20, manages communications statuses, manages a destination list, reports transmission destinations of the content data with respect to the relay apparatuses 30, and causes the relay apparatuses 30 to manage the communications statuses.

The transmission management system 50 is an information processing apparatus; however, the transmission management system 50 may be a monitoring camera, an industrial transmission terminal apparatus having a communications function, a wearable PC, and the like. The industrial apparatus includes an office apparatus including a multifunctional peripheral/printer/product (MFP), a medical instrument including an endoscope, and an agricultural apparatus including a cultivator. The wearable PC includes a watch and a head-mounted display.

The program providing system 90 includes a later-described hard disk (HD) 204 storing a terminal-specific program for causing the transmission terminals 10 or the mobile terminals 20 to implement various types of functions, and the program providing system 90 is configured to transmit the terminal-specific to the transmission terminals 10 or the mobile terminals 20. The program providing system 90 further includes a later-described hard disk (HD) 304 storing a management apparatus-specific program for causing the transmission management system 50 to implement various types of functions, and the program providing system 90 is configured to transmit the management apparatus-specific program to the transmission management system 50.

The transmission terminals (10aa, 10ab, 10ac, . . . ), the relay apparatus 30a, and the router 70a are coupled to one another via a LAN 2a such that the transmission terminals (10aa, 10ab, 10ac, . . . ), the relay apparatus 30a, and the router 70a may be in communications with one another. The transmission terminals (10ad, 10bb, 10bc, . . . ), the mobile terminals (20aa, 20ab, . . . ), the relay apparatus 30b, and the router 70b are coupled to one another via a LAN 2b such that the transmission terminals (10ad, 10bb, 10bc, . . . ), the mobile terminals (20aa, 20ab, . . . ), the relay apparatus 30b, and the router 70b may be in communications with one another. The LAN 2a and the LAN 2b are coupled via a dedicated line 2ab including a router 70ab such that the LAN 2a and the LAN 2b may be in communications with each other. The LAN 2a and the LAN 2b are constructed within a predetermined area A. For example, the predetermined area A may be Japan, the LAN 2a may be constructed within a Tokyo Office, and the LAN 2b may be constructed within an Osaka Office. The mobile terminals (20aa, 20ab, . . . ) are utilized in the area A.

The transmission terminals (10ca, 10cb, 10cc, . . . ), the relay apparatus 30c, and the router 70c are coupled to one another via a LAN 2c such that the transmission terminals (10ca, 10cb, 10cc, . . . ), the relay apparatus 30c, and the router 70c may be in communications with one another. The transmission terminals (10)da, 10db, 10dc, . . . ), the mobile terminals (20ac, 20ad, . . . ), the relay apparatus 30d, and the router 70d are coupled to one another via a LAN 2d such that the transmission terminals (10da, 10db, 10dc, . . . ), the mobile terminals (20ac, 20ad, . . . ), the relay apparatus 30d, and the router 70d may be in communications with one another. The LAN 2c and the LAN 2d are coupled via a dedicated line 2cd including a router 70cd such that the LAN 2c and the LAN 2d may be in communications with each other. The LAN 2c and the LAN 2d are constructed within a predetermined area B. For example, the predetermined area B may be the United States of America, the LAN 2c may be constructed within a NY Office, and the LAN 2d may be constructed within a Washington, D.C. Office. The mobile terminals (20*ac*, 20*ad*, . . . ) are utilized in the area B.

The transmission management system 50 and the program providing system 90 are coupled to the transmission terminals 10, the mobile terminals 20, and the relay apparatus 30 via the Internet 2*i* such that the transmission management system 50 and the program providing system 90 may be communicated with the transmission terminals 10, the mobile terminals 20, and the relay apparatus 30. The transmission management system 50 and the program providing system 90 may be installed within the area A or the area B, or may be installed within areas other than these areas.

In FIG. 3, a combination of four numbers provided beneath each of the transmission terminals 10, the mobile terminals 20, the relay apparatus 30, the transmission management system 50, the router 70, and the program providing system 90 simply represents an IP address in IPv4.

Hardware Configuration

Transmission Terminal

Figure 4:
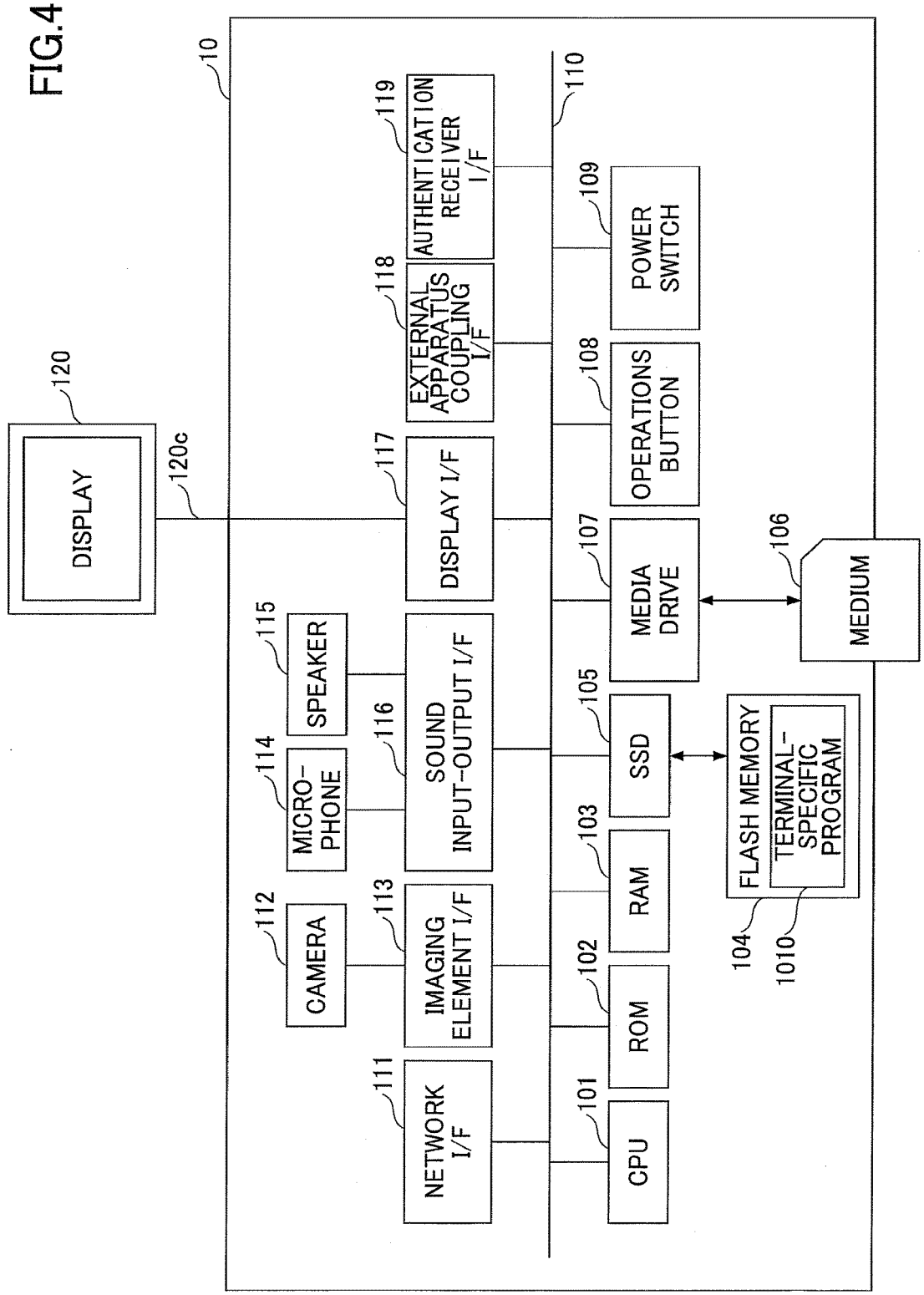
FIG. 4 is a hardware configuration diagram illustrating an example of a transmission terminal according to an embodiment.

Next, an illustration is given of a hardware configuration of a transmission terminal 10 with reference to FIG. 4. FIG. 4 is a hardware configuration diagram illustrating an example of a transmission terminal according to an embodiment. As illustrated in FIG. 4, the transmission terminal 10 includes a central processing unit (CPU) 101 configured to control overall operations of the transmission terminal 10. The transmission terminal 10 further includes a read only memory (ROM) 102 storing a program for driving the CPU 101 including an initial program loader (IPL) and a random access memory (RAM) 103 used as a work area of the CPU 101. The transmission terminal 10 further includes a flash memory 104 storing a terminal-specific program 1010 and various types of data including image data, sound or audio data. The transmission terminal 10 further includes a solid state drive (SSD) 105 configured to control reading or writing various types of data with respect to the flash memory 104 in accordance with control of the CPU 101. The transmission terminal 10 further includes a media drive 107 configured to read or write (store) data with respect to a recording medium 106 including a flash memory or the like and an operations button 108 operated for selecting a destination of the transmission terminal 10. The transmission terminal 10 further includes a power switch 109 for switching ON or OFF of the power of the transmission terminal 10 and a network interface (I/F) 111 for transmitting data utilizing a communications network 2.

Further, the transmission terminal 10 includes a built-in camera 112 configured to image a subject in accordance with the control of the CPU 101 to acquire image data, an imaging element I/F 113 configured to control the drive of the built-in camera 112, and a built-in microphone 114 configured to input sound and voice. The transmission terminal 10 further includes a built-in speaker 115 configured to output sound and voice and a sound input-output I/F 116 configured to perform input and output processes of sound signals between the microphone 114 and the speaker 115. The transmission terminal 10 further includes a display I/F 117 configured to transmit image data to a externally attached display 120 in accordance with the control of the CPU 101 and an external apparatus coupling I/F 118 configured to couple various types of external apparatuses to the transmission terminal 10. The transmission terminal 10 further includes an authentication receiver I/F 119 and a busline 110 including address bus or a data bus for electrically coupling the above-described components depicted in FIG. 4.

The display 120 is a display device formed of liquid crystal or an organic EL and is configured to display an image of the subject or operational icons. The display 120 is coupled to the display I/F 117 via a cable 120*c*. The display 120 of the transmission terminal 10 is coupled to the display I/F 117 via the cable 120*c*; however, the display 120 is not necessarily coupled to the display I/F 117. The display 120 may be incorporated in the transmission terminal 10.

The external apparatus coupling I/F 118 is configured to be coupled via a universal serial bus (USB) to each of the external apparatuses including an external camera, an external microphone, and an external speaker.

The authentication receiver I/F 119 is an interface configured to receive inputs from the user. Specific examples of the authentication receiver I/F 119 include readers including an IC card reader (e.g., near field communication (NFC)), an SD card, and a SIM card.

The above-described terminal-specific program 1010 may be distributed in a form of a computer-readable recording medium having stored the terminal-specific program 1010. Examples of the computer-readable recording medium include the recording medium 106, and the like having stored the programs in files of an installable format or an executable format. Alternatively, the terminal-specific program 1010 may be stored in the ROM 102 instead of the flash memory 104.

The hardware configuration of the mobile terminal 20 is similar to the hardware configuration of the transmission terminal 10, with most overlapping components and parts being almost the same. Thus, the construction of the transmission system 1 will not be affected by such a slight difference between the mobile terminal 20 and the transmission terminal 10.

Transmission Management System, Relay Apparatus, and Program Providing System

Figure 5:
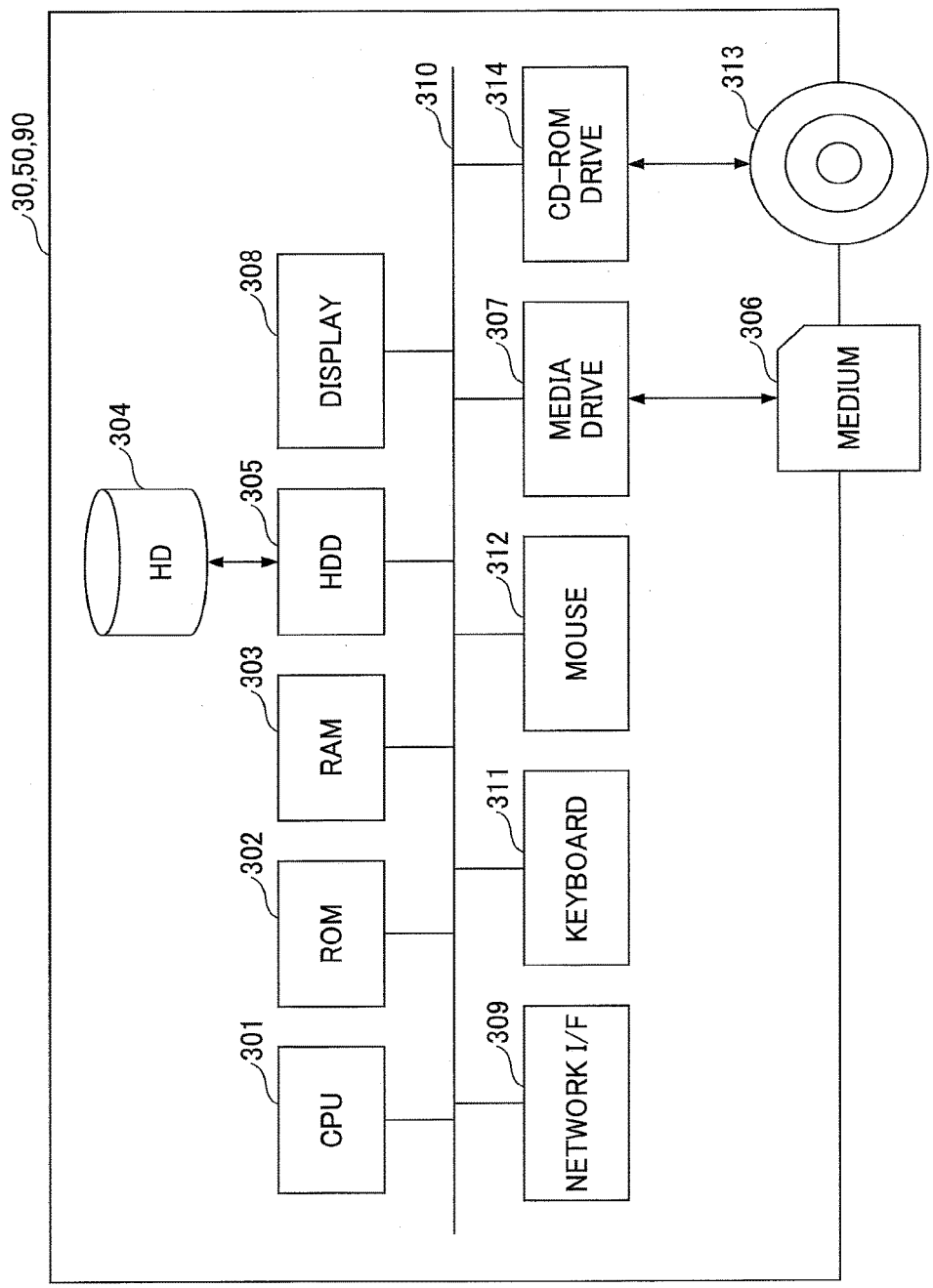
FIG. 5 is a hardware configuration diagram illustrating an example of a transmission management system according to an embodiment.

Next, an illustration is given of a hardware configuration of the transmission management system 50 with reference to FIG. 5. FIG. 5 is a hardware configuration diagram illustrating an example of the transmission management system 50 according to an embodiment.

Note that the depicted hardware configuration of the transmission management system 50 and the like does not necessarily have one physical entity of an apparatus housed in one case but merely represents hardware-like components desirable to be included in the transmission management system 50. The physical configuration of the transmission management system 50) of the embodiment and the like are not necessarily a statically fixed configuration and may be dynamically changing configuration having resources coupled or decoupled according to load imposed.

The transmission management system 50 includes a CPI 301 configured to control overall operations of the transmission management system 50, a ROM 302 storing programs including an IPL for driving the CPU 301, and a RAM 303 used as a work area of the CPU 301. The transmission management system 50 further includes an HD 304 storing various types of data including a management apparatus-specific program and a hard disk drive (HDD) 305 configured to control reading or writing of various types of data with respect to the HD 304. The transmission management system 50 further includes a media drive 307 configured to read or write (store) data with respect to a recording medium 306 including a flash memory and a display 308 configured to display various types information including a cursor, menus, windows, characters, or images. The transmission management system 50 further includes a network I/F 309 for transmitting data using the communications network 2, a keyboard 311 having multiple keys for input operations including characters, numbers, and various types of indications, and a mouse 312 operable to select various indications or execution, select process targets, and moving the cursor. The transmission management system 50 further includes a CD-ROM drive 314 configured to control reading or writing of various types of data with respect to a compact disc read only memory (CD-ROM) 313 as an example of removable recording medium. The transmission management system 50 further includes a busline 310 such as an address bus or a data bus for connecting the above-described components depicted in FIG. 5.

Note that the above-described management apparatus-specific program 5010 may be distributed in a form of the above-described computer-readable recording medium 306, the CD-ROM 313, or the like storing the program in files of an installable format or executable format. Alternatively, the above-described management apparatus-specific program 501 may be stored in the ROM 302 instead of the HD 304.

The relay apparatus 30 and the program providing system 90 have a hardware configuration similar to the hardware configuration of the transmission management system 50. Accordingly, a duplicated illustration of the hardware configurations of the relay apparatus 30 and the program providing system 90 are omitted from the specification.

Functional Configuration of Transmission System

Figure 6:
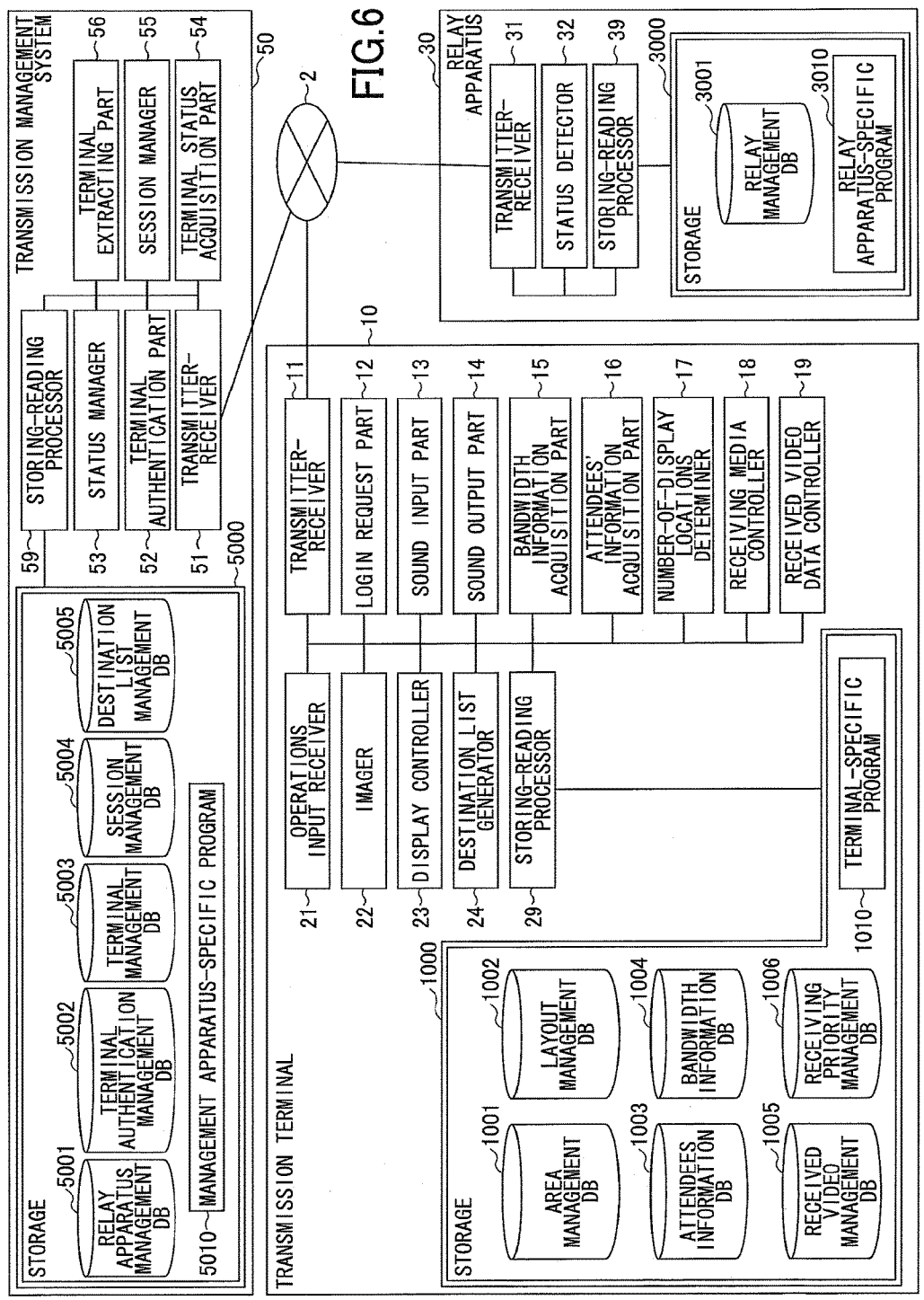
FIG. 6 is a block diagram illustrating the transmission management system, the transmission terminal, and a relay apparatus included in the transmission system according to the embodiment.

Next, an illustration is given of a hardware configuration of the transmission system 1 according to an embodiment with reference to FIG. 6. FIG. 6 is a functional block diagram illustrating the transmission management system 50, the transmission terminal 10, and the relay apparatus 30 included in the transmission system 1 according to the embodiment. In FIG. 6, the transmission terminal 10, the relay apparatus 30, and the transmission management system 50 are coupled via the communications network 2 to perform data communications with one another. The program providing system 90 illustrated in FIG. 3 is omitted from FIG. 6 because the program providing system 90 is not directly related to the communications.

Functional Configuration of Transmission Terminal

The transmission terminal 10 includes a transmitter-receiver 11, a login request part 12, sound input part 13, a sound output part 14, a bandwidth information acquisition part 15, an attendee information acquisition part 16, a number-of-display locations determiner 17, a receiving media controller 18, a received video data controller 19, an operations input receiver 21, an imager 22, a display controller 23, a destination list generator 24, and a storing-reading processor 29. The above-described components are functions or functional parts provided or implemented by causing any one of the components illustrated in FIG. 4 to operate any instructions from the CPU 101 in accordance with the terminal-specific program 1010 loaded from the flash memory 104 in the RAM 103.

The transmission terminal 10 includes a storage 1000 formed of the RAM 103, the ROM 102, and the flash memory 104 illustrated in FIG. 4. The storage 1000 stores an area management database (DB) 1001, a layout management DB 1002, an attendees' information DB 1003, a bandwidth information DB 1004, a received video management DB 1005, a receiving priority management DB 1006, and the terminal-specific program 1010.

The respective data bases are illustrated below.

TABLE 1

AREA MANAGEMENT TABLE

| AREA | DATA ID |
| --- | --- |
| I(501) | RS100 |
| II(502) | RS002 |
| III(503) | RS003 |

The storage 1000 includes the area management DB 1001 having a bandwidth information table. The bandwidth information table registers the later-described data IDs in association with areas I to III of the conference screen 500. The numbers in brackets for the areas I to III represent signs. The bandwidth information table registers an image data ID of image data or a display data ID of display data currently displayed in the corresponding area of the conference screen 500. Thus, the transmission terminal 10 that has transmitted the image data or the display data may be identified.

TABLE 2

LAYOUT MANAGEMENT TABLE

| NUMBER-OF-DISPLAY LOCATIONS | DISPLAY LOCATIONS | START POINT IN HORIZONTAL DIRECTION | END POINT IN HORIZONTAL DIRECTION | START POINT IN VERTICAL DIRECTION | END POINT IN VERTICAL DIRECTION |
| --- | --- | --- | --- | --- | --- |
| 1 | $1^{ST}$ | 0% | 100% | 0% | 100% |
| 2 | $1^{ST}$ | 0% | 50% | 0% | 100% |
|  | $2^{ND}$ | 50% | 100% | 0% | 100% |
| ... | ... | ... | ... | ... | ... |

The storage 1000 includes the layout management DB 1002 having a layout management table. The layout management table manages display locations, start points in a horizontal direction, end points in the horizontal direction, start points in a vertical direction, and end points in a vertical direction in association with the number of display locations. For example, when the number of locations is one (one location), the image data of this location are displayed with a starting point at 0% in a horizontal direction and in a vertical direction of the display 120. That is, one image data are displayed on the entire display.

TABLE 3

ATTENDEES' INFORMATION TABLE

| ATTENDING TERMINAL | IMAGE RECEPTION | SOUND RECEPTION | DISPLAY DATA RECEPTION |
| --- | --- | --- | --- |
| TRANSMISSION TERMINAL (01ab) | RS001: YES | RS200: YES | RS100: NO |

TABLE 3-continued

ATTENDEES' INFORMATION TABLE

| ATTENDING TERMINAL | IMAGE RECEPTION | SOUND RECEPTION | DISPLAY DATA RECEPTION |
|---|---|---|---|
| TRANSMISSION TERMINAL (01ac) | RS002: YES | RS201: YES | RS101: NO |
| TRANSMISSION TERMINAL (01ad) | RS003: NO | RS202: NO | RS102: NO |

The storage 1000 includes an attendees' information DB 1003 having an attendees' information table. The attendees' information table includes identification information of the image reception, sound reception, and display data reception, and the presence or absence of the received data in association of each of the attending terminals. The attending terminals indicate the transmission terminals that have established sessions. The attending terminals may be in one of modes to be ready to receive and transmit content data; however, the attending terminals are not necessarily currently receiving or transmitting the content data.

For example, RS001 is an image data ID of the transmission terminal 10ab (a communications ID: 01ab), RS200 is a sound data ID of the transmission terminal 10ab, and RS100 is a display data ID of the transmission terminal 10ab. That is, RS001 is identification information of the image data transmitted by the transmission terminal 10ab, which is uniquely identified by other transmission terminals 10 or the relay apparatuses 30. RS200 is identification information of the sound data transmitted by the transmission terminal 10ab, which is uniquely identified by other transmission terminals 10 or the relay apparatuses 30, and RS100 is identification information of the display data transmitted by the transmission terminal 10ab, which is uniquely identified by other transmission terminals 10 or the relay apparatuses 30. In the following, the identification information of each of the image reception, the sound reception, and the display data reception may be generically referred to as a "data ID". The method of creating attendees' information table will be illustrated later with reference to FIG. 9.

The IDs employed in the embodiments indicate identification information including languages, characters, symbols, and signs that uniquely identifies items subject to identification. Further, the communications IDs and the relay apparatus IDs may be identification information including a combination of at least two of the above languages, characters, symbols, and signs.

TABLE 4

BANDWIDTH INFORMATION TABLE

|  | IMAGE | SOUND | DISPLAY DATA | TOTAL |
|---|---|---|---|---|
| TRANSMISSION BANDWIDTH [kbps] | 1200 | 72 | 0 | 1272 |
| RECEPTION BANDWIDTH [kbps] | 200 | 72 | 0 | 272 |

The storage 1000 includes the bandwidth information DB 1004 including a bandwidth information table as illustrated in Table 4. The bandwidth information table includes a transmission bandwidth and a reception bandwidth of each of the image, the sound and the display data, and a total transmission bandwidth and a reception bandwidth of the image, the sound and the display data. For example, the reception bandwidth of the image secures 200 kbps. The bandwidth information table may preferably be updated periodically. Or the bandwidth information table may be appropriately updated so as not to exceed the maximum update period.

TABLE 5

RECEIVED VIDEO MANAGEMENT TABLE

| DATA ID | FINAL STORED TIME | FRAME DATA |
|---|---|---|
| RS100 | 1234555 | Frame_RS100_1234555 |
| RS002 | 1234450 | Frame_RS002_1234450 |
| RS003 | 1234500 | Frame_RS003_1234500 |
| RS010 | 1200000 | Frame_RS010_1200000 |

The storage 1000 includes a received video management DB 1005 including a received video management table as illustrated in Table 5. The received video management table manages the image data or frame data (static images) of the display data shared by the transmission terminals 10 attending the conference and stored time (e.g., a file name of "1234555") of the data. The field of the frame data indicates a file name or a path name of the framed data. The frame data may be directly stored. The received video management DB 1005 is an example of the storage.

TABLE 6

RECEIVING PRIORITY MANAGEMENT TABLE

| PRIORITY | DATA ID | FINAL OUTPUT TIME | RECEPTION STATUS | REASON FOR HAVING FORCEFULLY STOPPED RECEIVING DATA |
|---|---|---|---|---|
| 1 | RS100 | 1234560 | RECEIVING |  |
| 2 | RS002 | 1234550 | RECEIVING |  |
| 3 | RS003 | 1234560 | RECEIVING |  |
| 4 | RS001 | 1000000 | STOPPED RECEIVING |  |
| 5 | RS005 | 1100000 | STOPPED RECEIVING |  |
| 6 | RS010 | 1200100 | FORCEFULLY STOPPED RECEIVING | RS002 |
| 7 | RS004 | 1200000 | FORCEFULLY STOPPED RECEIVING | RS002 |

The storage 1000 includes a receiving priority management DB 1006 including a receiving priority management table as illustrated in Table 6. The receiving priority management table (priority information) manages a list of data shared by the transmission terminals 10 currently attending the conference, and includes priority, a data ID, a final output time, a reception status, and a reason for having forcefully stopped receiving data in association with each of the data.

The priority indicates the order in which the data are preferentially output among all the data received by the transmission terminals 10. The relay apparatus 30 attaches high priority to the identification information of the sound data transmitted by the transmission terminal 10 in another location, and outputs the sound data having higher priority to the transmission terminal 10. The transmission terminal 10 that has received the sound data having high priority updates the priority information of the receiving priority management table. The locations that recently generate sound are likely to have higher priority. The priority may be determined based on types of data (sound data, image data, and display data). In addition, the user may operate (optionally change) the priority. A later-described receiving media controller 18 stops receiving data having a data ID with low priority.

The final output time indicates a time at which each of content data are presented to the users last. In a case of the content data being the image data, the final output time may be the time at which the image data are displayed on the display 120 last. In a case of the content data being the sound data, the final output time may be the time at which the sound data are output by a reproducing device including a speaker last.

The reception status indicates whether each of the content data are received and the like. The reception status of "currently receiving" indicates that the transmission terminal 10 is currently receiving the content data. The reception status of "currently stop receiving" indicates that the transmission terminal 10 is ready to receive the data but currently stops receiving the content data because it is not necessary to receive the content data. For example, when the content data are the image data, it is not necessary to receive the image data because the image data have low priority and are hence not displayed on the conference screen 500. When the content data are sound data, because the communication destination generates no speech (no utterances). In this case, the transmission terminal of the communication destination may be used as a monitoring terminal that only monitors the conference. The reception status of "forcefully stopped receiving" indicates that the transmission terminal 10 is forcefully stopped receiving the content data by the later-described receiving media controller 18 in order to improve the reception status of receiving the content data having higher priority. In this case, since the transmission terminal 10 has forcefully stopped receiving other content data in order to receive the content data having higher priority in a better condition, the data ID of the content data having such higher priority is recorded in a "reason for having forcefully stopped receiving data" field.

Note that the DBs and the tables given above and also in the following description are only examples for convenience of illustration, and the information stored in the storage 1000 is not necessarily in a form of the DB or the table.

Functional Configuration of Transmission Terminal

Next, a detailed illustration is given of a functional configuration of the transmission terminal 10 with reference to FIGS. 4 and 6. The transmitter-receiver 11 of the transmission terminal 10 illustrated in FIG. 6 is implemented by instructions from the CPU 101 illustrated in FIG. 4 and by the network I/F 111 illustrated in FIG. 4. The transmitter-receiver 11 of the transmission terminal 10 is configured to transmit or receive various types of data or information with respect to the relay apparatus 30 and the transmission management systems 50 via the communications network 2. The transmitter-receiver 11 starts receiving status information indicating a status of each of the transmission terminals serving as destination candidates from the transmission management system 50 before starting communications with a desired destination terminal. The status information of the transmission terminal 10 indicates a detailed status including a currently communicating status and a status of currently being away from the seat even when the operating status being online in addition to an operating status (ON-LINE or OFFLINE). The transmitter-receiver 11 is an example of a receiver 11.

The login request part 12 of the transmission terminal 10 illustrated in FIG. 6 is implemented by instructions from the CPU 101 illustrated in FIG. 2. The login request part 12 of the transmission terminal 10 is configured to cause the login request part 12 to automatically transmit login request information representing an indication to request logging in and a current IP address of the request source terminal 10 to the transmission management system 50 via the communications network 2. In this case, the transmission of the login request and the IP address may be triggered by the power being turned on. Further, when the user switches the power switch 109 from an ON-status to an OFF-status, the operations input receiver 21 completely switches the power OFF after the transmitter-receiver 11 transmits to the transmission management system 50 status information indicating that the power will be switched OFF. The transmission management system 50 may thus be able to detect a change in the power status of the transmission terminal 10 from the power ON status to the power OFF status.

The sound input part 13 of the transmission terminal 10 illustrated in FIG. 6 is implemented by instructions from the CPU 101 illustrated in FIG. 4 and by the sound input-output I/F 116 illustrated in FIG. 4. The sound input part 13 of the transmission terminal 10 is configured to convert sound input by the microphone 114 into sound signals to input sound data associated with the sound signals.

The sound output part 14 of the transmission terminal 10 illustrated in FIG. 6 is implemented by instructions from the CPU 101 illustrated in FIG. 4 and by the sound input-output I/F 116 illustrated in FIG. 4. The sound output part 14 of the transmission terminal 10 is configured to output the sound signals associated with the sound data to the speaker 115 to cause the speaker 115 to output sounds.

The bandwidth information acquisition part 15 of the transmission terminal 10 illustrated in FIG. 6 is implemented by instructions from the CPU 101 illustrated in FIG. 4 and by the network I/F 111 illustrated in FIG. 4. The bandwidth information acquisition part 15 of the transmission terminal 10 is configured to acquire a current reception bandwidth and a current transmission bandwidth of the communications network 2. The reception bandwidth and the transmission bandwidth are registered in the bandwidth information table. The bandwidth information acquisition part 15 of the transmission terminal 10 may measure the mean communications rate between the transmission terminal 10 and the transmission management system 50 or the mean communications rate between the transmission terminal 10 and the relay apparatus 30, and may acquire bandwidth information from the transmission management system 50 or the relay apparatus 30. The bandwidth information acquisition part 15 of the transmission terminal 10 may not necessarily handle the actual communications rate as the bandwidths to use; however, the bandwidth information acquisition part 15 may calculate the maximum communications rate within a predetermined period to handle the calculated value as the bandwidth to use.

The attendee information acquisition part 16 of the transmission terminal 10 illustrated in FIG. 6 is implemented by instructions from the CPU 101 illustrated in FIG. 4. The attendee information acquisition part 16 of the transmission terminal 10 is configured to acquire information associated with the transmission terminals currently attending the conference to register the acquired information into the attendees' information table of the attendees' information DB 1003. The information to be registered in the attendees' information table is acquired from the transmission management system 50 and the relay apparatus 30.

The number-of-display locations determiner 17 of the transmission terminal 10 illustrated in FIG. 6 is implemented by instructions from the CPU 101 illustrated in FIG. 4. The number-of-display locations determiner 17 of the transmission terminal 10 is configured to determine the number of locations (the image data) to be displayed on the conference screen 500 of the display 120. Specifically, the number of locations to be displayed on the conference screen 500 may be determined by the user's setting the desired number of locations within a range of not exceeding the upper limit of the resolution (size) of the display 120. When the user has not determined the number of locations to be displayed on the conference screen 500, the number of locations to be displayed on the conference screen 500 may be increased with the number of attending transmission terminals.

The receiving media controller 18 of the transmission terminal 10 illustrated in FIG. 6 is implemented by instructions from the CPU 101 illustrated in FIG. 4. The receiving media controller 18 of the transmission terminal 10 is configured to refer to the receiving priority management table to restart receiving the content data that the transmission terminal 10 has been forcefully stopped receiving or has been stopped receiving. Details of the above process will be described later. The receiving media controller 18 is an example of a video data determiner.

The received video data controller 19 of the transmission terminal 10 illustrated in FIG. 6 is implemented by instructions from the CPU 101 illustrated in FIG. 4. The received video data controller 19 of the transmission terminal 10 is configured to determine, upon receiving the image data or the display data, whether to save frame data of the received image data or the display data, and optionally save the frame data and update the receiving priority management table. The received video data controller 19 periodically monitors the receiving priority management table, and requests frame data of the image data or the display data that have not been updated for a long time. Details of the above process will be described later. The received video data controller 19 is an example of a static image data storage.

The operations input receiver 21 of the transmission terminal 10 illustrated in FIG. 6 is implemented by instructions from the CPU 101 illustrated in FIG. 4, and by the operations button 108 and the power switch 109 illustrated in FIG. 4. The operations input receiver 21 of the transmission terminal 10 is configured to receive various types of inputs from users. For example, when the user switches the power switch 109 illustrated in FIG. 4 ON, the operations input receiver 21 illustrated in FIG. 4 receives a power ON instruction to switch the power ON.

The imager 22 of the transmission terminal 10 illustrated in FIG. 6 is implemented by instructions from the CPU 101 illustrated in FIG. 4, and by the camera 112 and the imaging element I/F 113 illustrated in FIG. 4. The imager 22 of the transmission terminal 10 is configured to image a subject to acquire image data of the subject and output the acquired image data.

The display controller 23 of the transmission terminal 10 illustrated in FIG. 6 is implemented by the instructions from the CPU 101 illustrated in FIG. 4 and by the display I/F 117 illustrated in FIG. 4. The display controller 23 of the transmission terminal 10 is configured to generate the conference screen 500 and control transmission of the conference screen 500 to the display 120. The display controller 23 is an example of a display processor.

The destination list generator 24 of the transmission terminal 10 illustrated in FIG. 6 is implemented by the instructions from the CPU 101 illustrated in FIG. 4. The destination list generator 24 of the transmission terminal 10 is configured to generate a destination list having icons indicating the statuses of the destination candidate transmission terminals 10 and update the generated destination list, based on the status information of the destination candidate transmission terminals 10 received from the transmission management system 50.

The storing-reading processor 29 of the transmission terminal 10 illustrated in FIG. 6 is implemented by instructions from the CPU 101 illustrated in FIG. 4 and by the SSD 105 illustrated in FIG. 4. The storing-reading processor 29 of the transmission terminal 10 is configured to store various types of data in a storage 1000 and read various types of data stored in the storage 1000. Note that the storage 1000 is configured to overwrite, in addition to the DBs and the program depicted in the storage 1000 of FIG. 6, image data, sound data, and display data received at calling communications with the destination terminal(s) every time the image data, the sound data, and the display data are received.

Note that the DBs and the tables given in the above description and also given in the following description are only examples for convenience of illustration, and the information stored in the storage 1000 is not necessarily stored in forms of the DBs or the tables.

Functional Configuration of Transmission Management System

The transmission management system 50 includes a transmitter-receiver 51, a terminal authentication part 52, a status manager 53, a terminal status acquisition part 54, a session manager 55, a terminal extracting part 56, and a storing-reading processor 59. The above-described components are functional components or functional parts implemented by causing any one of the components illustrated in FIG. 5 to operate instructions from the CPU 301 in accordance with a management apparatus-specific program 5010 loaded from the HDD 305 in the RAM 303.

The transmission management system 50 includes a storage 5000 formed of the HDD 305, the RAM 303, and the ROM 302, and the like illustrated in FIG. 5. An illustration is given below of various types of databased stored in the storage 5000.

TABLE 7

RELAY APPARATUS MANAGEMENT TABLE

| RELAY APPARATUS ID | OPERATING STATUS | RECEIVED DATE AND TIME | IP ADDRESS OF RELAY APPARATUS | MAXIMUM DATA TRANSMISSION RATE (Mbps) |
|---|---|---|---|---|
| 111a | ONLINE | 2013.11.10.13:00 | 1.2.1.2 | 100 |
| 111b | ONLINE | 2013.11.10.13:10 | 1.2.2.2 | 1000 |
| 111c | OFFLINE | 2013.11.10.13:20 | 1.3.1.2 | 100 |
| 111d | ONLINE | 2013.11.10.13:30 | 1.3.2.2 | 10 |

Table 7 illustrates the relay apparatus management DB 5001 having the relay apparatus management table. The storage 5000 includes the relay apparatus management DB 5001 having the relay apparatus management table. The relay apparatus management table is configured to manage operating statuses of the relay apparatuses 30, received times and dates of the status information indicating the operating statuses received by the transmission management system 50, IP addresses of the relay apparatuses 30, and the maximum data transmission rates (Mbps) of the relay apparatuses 30 in association with respective relay apparatus IDs for identifying the relay apparatuses 30.

TABLE 8

TERMINAL AUTHENTICATION MANAGEMENT TABLE

| TERMINAL ID | PASSWORD |
|---|---|
| 01aa | aaaa |
| 01ab | abab |
| 01ac | acac |
| ... | ... |

The storage 5000 includes a terminal authentication management DB 5002 having a terminal authentication management table. The terminal authentication management table is configured to manage the terminal IDs of all the terminals 10 managed by the transmission management system 50 in association with respective passwords.

TABLE 9

TERMINAL MANAGEMENT TABLE

| COMMUNICATIONS ID | NAME | OPERATING STATUS | RECEIVED DATE AND TIME | IP ADDRESS |
|---|---|---|---|---|
| 01aa | AA CONFERENCE TERMINAL | ONLINE | 2013.11.10.13:40 | 1.2.1.3 |
| 01ab | AB CONFERENCE TERMINAL | ONLINE | 2013.11.09.12:00 | 1.2.1.4 |
| 01ac | AC CONFERENCE TERMINAL | ONLINE | 2013.11.11.13:00 | 1.2.1.5 |
| 01ad | AD CONFERENCE TERMINAL | ONLINE | 2013.11.10.13:45 | 1.2.2.3 |
| 01bb | BB CONFERENCE TERMINAL | OFFLINE | 2013.11.10.13:50 | 1.2.2.4 |

The storage 5000 includes a terminal management DB 5003 having a terminal management table. The terminal management table is configured to manage names as destinations (destination names) of the transmission terminals 10, operating statuses of the transmission terminals 10, received times and dates of the later-described login request information received by the transmission management system 50, and IP addresses of the transmission terminals 10 in association with respective communications IDs of the transmission terminals 10.

TABLE 10

DESTINATION LIST MANAGEMENT TABLE

| COMMUNICATIONS ID | DESTINATION LIST |
|---|---|
| 01aa | 01ab, 01ac, 01ad, 01bb |
| 01ab | 01aa, 01ac, 01ad, 01bb |
| 01ac | 01aa, 01ab, 01ad, 01bb |
| 01ad | 01aa, 01ab, 01ac, 01bb |
| 01bb | 01aa, 01ab, 01ac, 01ad |
| ... | ... |

The storage 5000 includes a destination list management DB 5004 having a destination list management table. The destination list management table is configured to manage all the communications IDs of the destination terminals registered as destination terminal candidates in association with the communications ID of the request source terminal that has transmitted a communications start request for starting the communications in the TV conference. For example, as illustrated in the destination list management table illustrated in Table 10, the destination terminal candidates, to which the communication start request for starting the communications in the TV conference is transmitted from the request source terminal (the transmission terminal 10aa) having the communications ID "01aa", are the transmission terminal 10ab having the communications ID "01ab", the transmission terminal 10ac having the communications ID "01ac", the transmission terminal 10ad having the communications ID "01ad", and the transmission terminal 10bb having the communications ID "01bb".

TABLE 11

SESSION MANAGEMENT TABLE

| SESSION ID | RELAY APPARATUS ID | REQUEST SOURCE TERMINAL ID | DESTINATION TERMINAL ID | CONFERENCE ID |
|---|---|---|---|---|
| se1 | 111a | 01aa | 01ac | C01 |
| se2 | 111b | 01aa | 01ab | C01 |
| se3 | 111d | 01aa | 01ad | C01 |
| ... | ... | ... | ... | ... |

The storage 5000 includes a session management DB 5005 having a session management table. The session management table is configured to manage the relay apparatus IDs of the relay apparatuses 30 used for relaying image data and sound data, the communications ID of the request source terminal, and the communications IDs of the destination terminals in association with respective session IDs for executing sessions to select desired relay apparatuses 30. The session IDs are IDs for identifying respective sessions, and the transmission terminals 10 attending the same conference are not necessarily included in the same session. By contrast, the transmission terminals 10 attending the same conference are provided with the same conference ID.

Functional Configuration of Transmission Management System

Next, a detailed illustration is given of respective functional components of the transmission management system 50. The transmitter-receiver 51 of the transmission management system 50 illustrated in FIG. 6 is implemented by instructions from the CPU 301 illustrated in FIG. 5, and executed by the network I/F 309 illustrated in FIG. 5. The transmitter-receiver 51 of the transmission management system 50 is configured to transmit or receive various types of data with respect to the transmission terminals 10 or the relay apparatuses 30 via the communications network 2.

The terminal authentication part 52 of the transmission management system 50 illustrated in FIG. 6 is implemented by instructions from the CPU 301 illustrated in FIG. 5. The terminal authentication part 52 of the transmission management system 50 is configured to authentication the transmission terminals 10 using the communications IDs and passwords included in login request information received via the transmitter-receiver 51 as search keys. That is, the terminal authentication part 52 of the transmission management system 50 authenticate the transmission terminals 10 by searching the terminal authentication management DB 5002 to determine whether terminal authentication management DB 5002 includes the communications IDs and passwords identical to the communications IDs and passwords included in the login request information. Note that the authentication method is not limited to the above-described method. The authentication method may employ client certificates (i.e., authentication method using public keys and secret keys).

The status manager 53 of the transmission management system 50 illustrated in FIG. 6 is implemented by instructions from the CPU 301 illustrated in FIG. 5. The status manager 53 of the transmission management system 50 is configured to manage the operating status of the request source terminal, received time and date of the login request information received by the transmission management system 50, and an IP address of the request source terminal stored in association with the communications ID of the request source terminal in the terminal management DB 5003 in order to manage the operating status of the request source terminal that has transmitted a login request.

The status manager 53 of the transmission management system 50 switches the power switch 109 of the transmission terminal 10 from an ON status to an OFF status to change the operation status indicating "ONLINE" to "OFFLINE" in the terminal management DB, based on the status information representing an indication to switch the power OFF transmitted from the transmission terminal 10.

The terminal extracting part 56 of the transmission management system 50 illustrated in FIG. 6 is implemented by instructions from the CPU 301 illustrated in FIG. 5. The terminal extracting part 56 of the transmission management system 50 is configured to search the destination list management DB 5004 by the communications ID of the login requested request source terminal as a key to read the communications IDs of the destination terminal candidates available for having communications with the request source terminal. The terminal extracting part 56 of the transmission management system 50 also searches the destination list management DB 5004 by the communications ID of the login requested request source terminal as a key to extract the communications ID of another request source terminal that has registered the communications ID of the request source terminal as a destination terminal candidate.

The terminal status acquisition part 54 of the transmission management system 50 illustrated in FIG. 6 is implemented by instructions from the CPU 301 illustrated in FIG. 5. The terminal status acquisition part 54 of the transmission management system 50 is configured to search the terminal management DB 5003 by the communications IDs of the destination terminal candidates extracted by the terminal extracting part 56 as search keys to read the operating statuses of the communications IDs extracted by the terminal extracting part 56. As a result, the terminal status acquisition part 54 may be able to acquire the operating statuses of the destination terminal candidates capable of having communications with the login requested request source terminal.

The session manager 55 of the transmission management system 50 illustrated in FIG. 6 is implemented by instructions from the CPU 301 illustrated in FIG. 5. The session manager 55 of the transmission management system 50 is configured to manage the communications IDs of the request source terminals, the communications IDs of the destination terminals, and the conference IDs stored in association with the session IDs in the session management DB 5005.

The storing-reading processor 59 of the transmission management system 50 illustrated in FIG. 6 is implemented by instructions from the CPU 301 illustrated in FIG. 5 and executed by the HDD 305 illustrated in FIG. 5. The storing-reading processor 59 of the transmission management system 50 is configured to store various types of data in the storage 5000, and read various types of data stored in the storage 5000.

Functional Configuration of Relay Apparatus

The relay apparatus 30 includes a transmitter-receiver 31, a status detector 32, and a storing-reading processor 39. The above-described components are functional components or functional parts implemented by causing any one of the components illustrated in FIG. 5 to operate instructions from the CPU 301 in accordance with a relay apparatus program 3010 loaded from the HD 304 in the RAM 303.

The relay apparatus 30 includes a storage 3000 formed of the HD 304 illustrated in FIG. 5. The storage 3000 includes a relay management DB 3001 and the relay apparatus program 3010.

TABLE 12

RELAY MANAGEMENT TABLE

| CONFERENCE ID | COMMUNICATIONS ID | IP ADDRESS | DATA ID |
|---|---|---|---|
| C01 | 01aa | 1.2.1.3 | RS000, RS203, RS103 |
|  | 01ab | 1.2.1.4 | RS001, RS200, RS100 |
|  | 01ac | 1.2.1.5 | RS002, RS201, RS101 |
|  | 01ad | 1.2.2.3 | RS003, RS202, RS102 |

The storage 3000 includes the relay apparatus management DB 3001 having a relay apparatus management table. The relay apparatus management table registered the communications IDs, the IP addresses, and the data IDs of the transmission terminals 10 attending the conference in association with the conference ID of the conference.

The transmitter-receiver 31 of the relay apparatus 30 illustrated in FIG. 6 is implemented by instructions from the CPU 301 illustrated in FIG. 5 and by the network I/F 309 illustrated in FIG. 5. The transmitter-receiver 31 of the relay apparatus 30 is configured to transmit or receive various types of data or information with respect to the transmission apparatus 10 or the transmission management systems 50 via the communications network 2.

The status detector 32 of the relay apparatus 30 illustrated in FIG. 6 is implemented by instructions from the CPU 301 illustrated in FIG. 5. The status detector 32 of the relay apparatus 30 is configured to detect an operating status of the relay apparatus 30 having the status detector 32. The operating status includes an "ONLINE" status, an "OFFLINE" status, an "engaged" status and a "temporary stopped" status.

The storing-reading processor 39 of the relay apparatus 30 illustrated in FIG. 6 is implemented by instructions from the CPU 301 illustrated in FIG. 5 and by the HDD 305 illustrated in FIG. 5. The storing-reading processor 39 of the relay apparatus 30 is configured to store various types of data in the storage 3000, and read various types of data stored in the storage 3000.

From Start of Communications to Session Establishment

Figure 7:
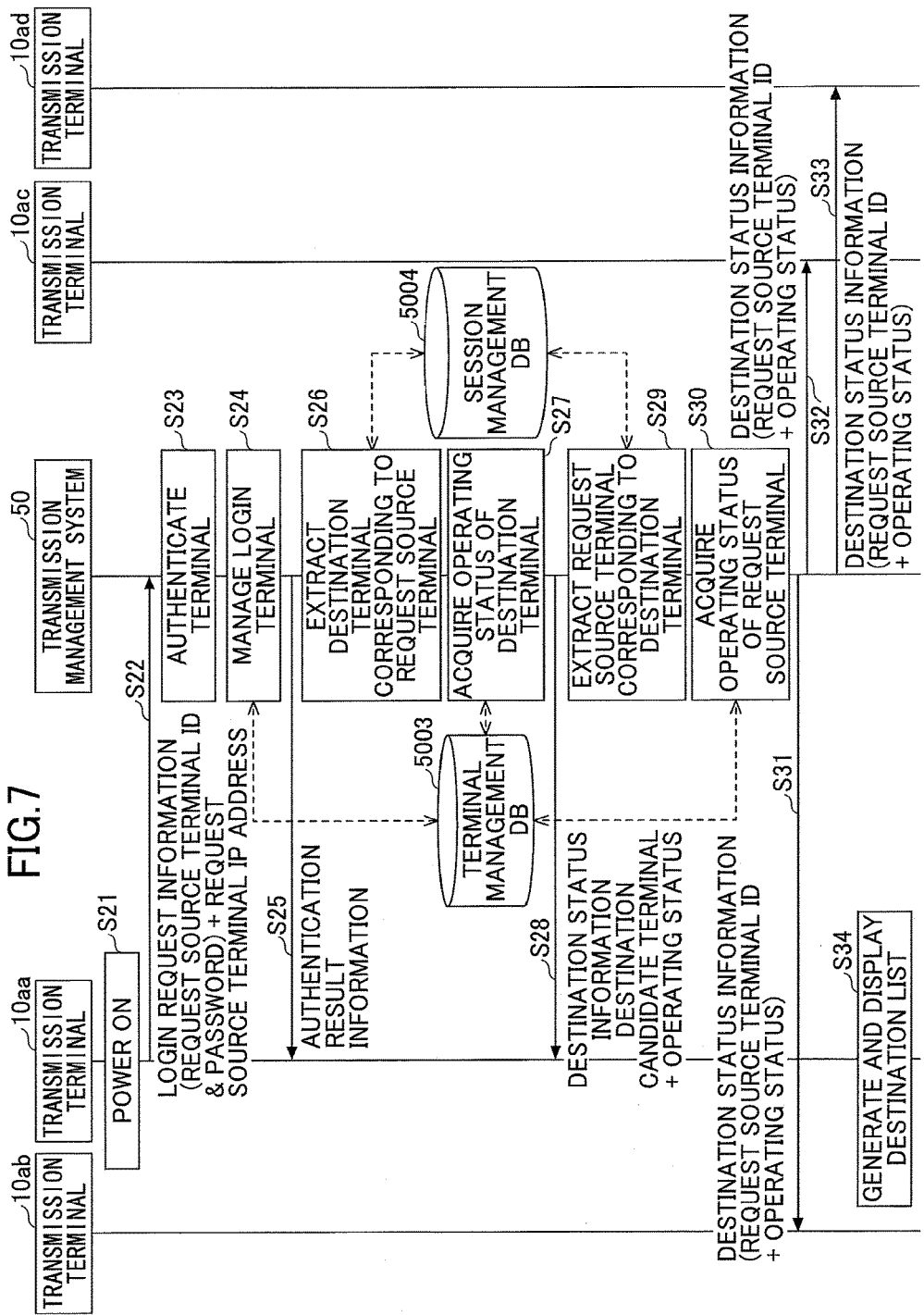
FIG. 7 is a sequence diagram illustrating a process example in preparation to start communications between multiple transmission terminals according to the embodiment.

FIG. 7 is a sequence diagram illustrating an example of a preparation process to start communications between two or more transmission terminals 10. Specifically, FIG. 7 illustrates the preparation process for the transmission terminal 10aa to start communications with the transmission terminals 10ac, 10ab, and 10ad.

Initially, when the user switches the power switch 109 ON, the operations input receiver 21 receives a power ON instruction to turn the power ON (step S21). Then, the login request part 12 of the transmission terminal 10aa automatically causes the transmitter-receiver 11 to transmit login information indicating a login request to the transmission management system 50 via the communications network 2 based on the received power ON instruction as a trigger (step S22). The login request may also be transmitted at any timing by the user's operations in addition to at the reception of the power ON instruction. This login request information includes a communications ID and a password for identifying the transmission terminal 10aa as the request source terminal. Note that when the login request information is transmitted from the transmission terminal 10aa to the transmission management system 50, the receiver side transmission management system 50 is capable of detecting the "IP address" of the transmission terminal 10aa. Note that the mobile terminal 20 is a request source terminal, the operations input receiver 21 receives the user's login operations to transmit the communications ID and the password to the transmission management system 50.

Subsequently, the terminal authentication part 52 of the transmission management system 50 determines whether the communications ID and the password identical to the communications ID and the password included in the received login request information are managed to authenticate the transmission terminal 10aa (step S23). In this embodiment, it is assumed that the authentication is established.

When the authentication of the transmission terminal 10aa is established by the terminal authentication part 52, the status manager 53 stores the operating status and the communications status of the transmission terminal 10aa, the received time at which the login request information of the transmission terminal 10aa is received, and the IP address of the transmission terminal 10aa in association with the communications ID of the transmission terminal 10aa in the terminal management table (step S24). Note that the operating status of the transmission terminal 10aa at this time is "ONLINE".

The transmitter-receiver 51 of the transmission management system 50 then transmits authentication result information indicating an authentication result obtained by the terminal authentication part 52 to the transmission terminal 10aa that has transmitted the login request via the communications network 2 (step S25).

The terminal extracting part 56 of the transmission management system 50 searches the destination list management table by the communications ID "01aa" of the login requested transmission terminal 10aa as a search key to extract the communications IDs of the destination candidate transmission terminals capable of having communications with the transmission terminal 10aa (step S26). In this case, the communications IDs "01ab", "01ac", "01ad", and "01bb" of the destination terminals (10ab, 10ac, 10ad, and 10bb) corresponding to the communications ID "01aa" of the transmission terminal 10aa are extracted.

The terminal status acquisition part 54 searches the terminal management table by the communications IDs (01ab, 01ac, 01ad, and 01bb) of the transmission terminals 10ab, 10ac, 10ad, and 10bb extracted by the terminal extracting part 56 as search keys to read the respective operating statuses of the communications IDs (step S27). In this example, it is assumed that the operating statuses of the transmission terminals 10ab, 10ac, and 10ad are "ONLINE", and the operating status of the transmission terminal 10bb is "OFFLINE".

The transmitter-receiver 51 subsequently transmits destination status information including the communications IDs (01ab, 01ac, 01ad, and 01bb) extracted by the terminal extracting part 56 and the respective operating statuses to the transmission terminal 10aa via the communications network 2 (step S28). The transmission terminal 10aa may be able to detect the current operating statuses of the respective transmission terminals 10 (10ab, 10ac, 10ad, and 10bb) capable of having communications with the transmission terminal 10aa.

The terminal extracting part 56 of the transmission management system 50 searches the destination list management table by the communications ID "01aa" of the login requested transmission terminal 10aa as a search key to extract the communications IDs of the other transmission terminals 10 registered as destination terminal candidates (step S29). The communications IDs of the extracted other transmission terminals 10 in the above-described destination list management table are "01ab", "01ac", "01ad", and "01bb".

The terminal status acquisition part 54 of the transmission management system 50 subsequently searches the terminal management table by the communications ID "01aa" of the login requested transmission terminal 10aa as a search key to acquire the operating status of the transmission terminal 10aa (step S30).

The transmitter-receiver 51 transmits destination status information of the transmission terminal 10aa acquired in step S30 including the communications ID "01aa" and the operating status "ONLINE" to the transmission terminals 10 having the operating status "ONLINE" among the transmission terminals 10 having the communications IDs "01ab", "01ac" "01ad" and "01bb" extracted in step S29 in the terminal management table (steps S31, S32 and S33). Accordingly, the destination status information is transmitted to the transmission terminals 10ab, 10ac, and 10ad. Note that when the transmitter-receiver 51 transmits the destination status information to the transmission terminals 10ab, 10ac, and 10ad, the transmitter-receiver 51 refers to the IP addresses of the transmission terminals 10 managed in the terminal management table based on the communications IDs "01ab", "01ac", and "01ad".

When the destination list generator 24 of the transmission terminal 10aa receives the destination list information and the operating statuses of the destination terminal candidates, the destination list generator 24 generates a destination list screen and displays the destination list screen on the display device 203 (step S34). The generated destination list screen displays the names of the transmission terminals 10ab, 10ac, and 10ad, and the operating statuses "ONLINE" of the transmission terminals 10ab, 10ac, and 10ad as well as the names of the transmission terminal 10bb and the operating status "OFFLINE" of the transmission terminal 10bb.

On the other hand, each of the transmission terminals 10ab, 10ac, and 10ad may perform a process similar to that illustrated in FIG. 7 to display the destination list screen on the display 120 of the destination candidate transmission terminal 10.

Figure 8:
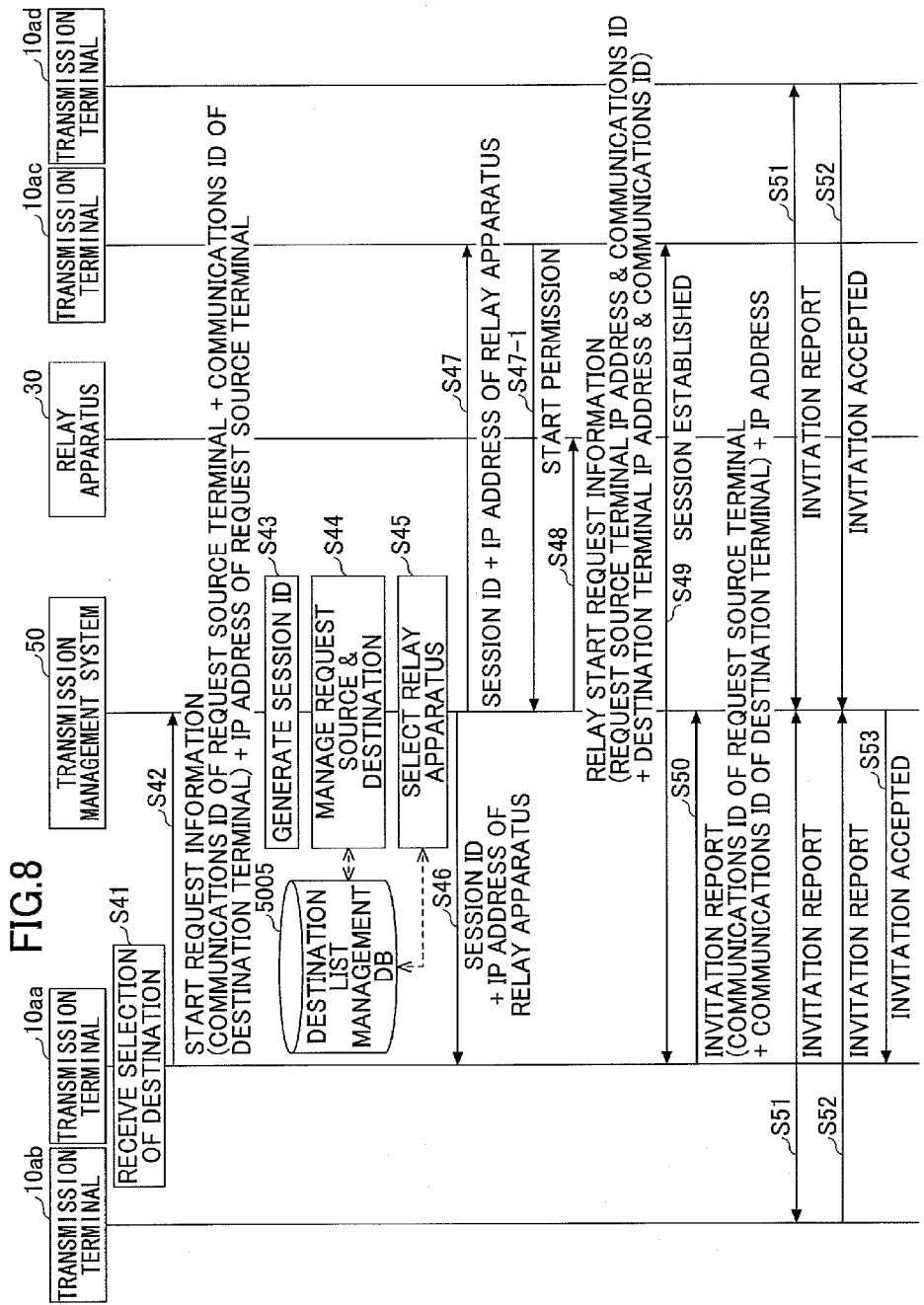
FIG. 8 is a sequence diagram illustrating a process example of establishing a session between the multiple transmission terminals according to the embodiment.

FIG. 8 is a sequence diagram illustrating a process example of establishing a session between two or more transmission terminals 10 according to an embodiment.

When the user selects a destination terminal having the communications ID of "01ac" from the destination list screen via the operations button 108 of the transmission terminal 10aa, the operations input receiver 21 receives a coupling start request (step S41).

The transmitter-receiver 11 of the transmission terminal 10aa transmits start request information representing to the transmission management system 50 (step S42). The start request information includes "01aa" representing the communications ID of the transmission terminal 10aa and "01ac" representing the communications ID of the destination terminal (step S42). The transmission management system 50 detects the "IP address" of the request source terminal (the transmission terminal 10aa) in the above-described manner.

The session manager 55 of the transmission management system 50 subsequently generates a "session ID" (step S43). The session ID generated is a unique ID (non-overlapped ID).

The session manager 55 of the transmission management system 50 subsequently stores the generated "session ID" in association with the communications ID "01aa" of the request source terminal (the transmission terminal 10aa) and the communications ID "01ac" of the destination terminal (the transmission terminal 10ac) in the session management DB 5005 (step S44). The session ID is also stored in association with the conference ID.

The session manager 55 of the transmission management system 50 determines an appropriate one of the relay apparatuses 30 for the request source terminal and the destination terminal to perform communications with each other (step S45). Among the relay apparatuses 30 over the network, the relay apparatus 30 with the widest bandwidth may, for example, be determined as the appropriate one of the relay apparatuses 30.

Note that without selecting the relay apparatus 30, a session may be established directly between the request source terminal and the destination terminal or a session may be established between the request source terminal and the destination terminal via the transmission management system 50.

The transmitter-receiver 51 of the transmission management system 50 transmits the "session ID" generated in step S43 and the "IP address" of the relay apparatus 30 determined in step S45 to the request source terminal (the transmission terminal 10aa) and the destination terminal (the transmission terminal 10ac) (steps S46 and S47).

The display controller 23 of the transmission terminal 10ac may display the communications ID of the request source terminal (the transmission terminal 10aa) on the display 120 (the display device 203 in a case of the mobile terminal 20), and the operations input receiver 21 receives permission to start the TV conference from the user. The transmitter-receiver 11 of the transmission terminal 10ac subsequently transmits the start permission to the transmission management system 50 (step S47-1).

The status manager 53 of the transmission management system 50 the IP address and the communications ID of the request source terminal (the transmission terminal 10aa), the IP address and the communications ID of the destination terminal (the transmission terminal 10ac), and the conference ID as relay-start request information to the relay apparatus 30 (step S48). The relay apparatus 30 manages the conference ID in association with the communications IDs in the relay management table. The relay apparatus 30 assigns non-duplicated data IDs to each of the communications IDs. The data ID may be reported or not reported to each of the transmission terminals 10. In a case where the data IDs are reported to each of the transmission terminal 10s, the transmission terminals 10 attach the data IDs to the content data and transmit the content data with the data IDs to the relay apparatus 30. In a case where the data IDs are not reported to each of the transmission terminal 10s, the relay apparatus 30 identifies the transmission terminals 10 based on the IP addresses or the like, assigns the data IDs to the content data, and transmits the content data with the data IDs to the transmission terminals 10.

The transmitter-receiver 31 of the relay apparatus 30 that has received the communications IDs from the transmission management system 50 detects that the transmission terminal 10aa and the transmission terminal 10ac are the destination terminals for transmitting the content data based on the respective communications IDs transmitted from the transmission terminal 10aa and the transmission terminal 10ac. A session is thus established between the request source terminal (the mobile terminal 10aa) and the destination terminal (the transmission terminal 10ac) (step S49). When the session is established, the transmission terminal 10aa transmits the content data to the transmission terminal 10ac via the relay apparatus 30, and the transmission terminal 10ac transmits the content data to the transmission terminal 10aa via the relay apparatus 30.

The user of the transmission terminal 10aa transmits an invitation report to the transmission management system 50 (step 350). The invitation report indicates a report for allowing other transmission terminals 10 to attend the TV conference that has already established the session. The invitation report includes the communications ID "01aa" of the transmission terminal 10aa that has transmitted the invitation report, and the communications ID "01ab" of the transmission terminal 10ab and the communications ID "01ad" of the transmission terminal 10ad that have been invited to the TV conference. The transmission management system 50 acquires the "IP address" of the transmission terminal 10aa that has transmitted the invitation report.

When the transmitter-receiver 51 of the transmission management system 50 has received the invitation report, the terminal status acquisition part 54 of the transmission management system 50 acquires the respective "IP addresses" of the transmission terminal 10ab and the transmission terminal 10ad that have been invited to the TV conference from the terminal management table. The transmitter-receiver 51 of the transmission management system 50 thus transmits the respective invitation reports to the transmission terminal 10ab and the transmission terminal 10ad (step S51).

The display controller 23 of each of the transmission terminal 10ab and the transmission terminal 10ad may display the communications ID of the request source terminal (the transmission terminal 10aa) on the display 120 (the display device 203 in a case of the mobile terminal 20), and the operations input receiver 21 receives a response to the invitation report for the TV conference from the respective users. It is assumed that the users have accepted the invitation. The transmitter-receiver 11 of each of the transmission terminal 10ab and the transmission terminal 10ad subsequently transmits the invitation acceptance to the transmission management system 50 (step S52).

The session manager 55 of the transmission management system 50 the conference ID the same as the conference ID of the transmission terminal 10aa and the transmission terminal 10ac to the transmission terminal 10ab and the transmission terminal 10ad.

The transmitter-receiver 51 of the transmission management system 50 transmits the invitation acceptance to the transmission terminal 10aa that has transmitted the invitation report (step S53).

The transmitter-receiver 51 of the transmission management system 50 subsequently performs processes in steps S47 and S48 with respect to the invited transmission terminals 10ab and 10ad to allow the transmission terminal 10ab and the transmission terminal 10ad to attend the session with the transmission terminal 10aa and the transmission terminal 10ac. The relay apparatus 30 transmits (forwards) the content data between the transmission terminals 10aa, 10ac, 10ab, and 10ad having the same conference ID.

The content data are thereafter transmitted between the request source terminal (the transmission terminal 10aa), the destination terminal (the transmission terminal 10ac), and the invited transmission terminals 10ab and 10ad.

Creating Attendees' Information Table

Figure 9:
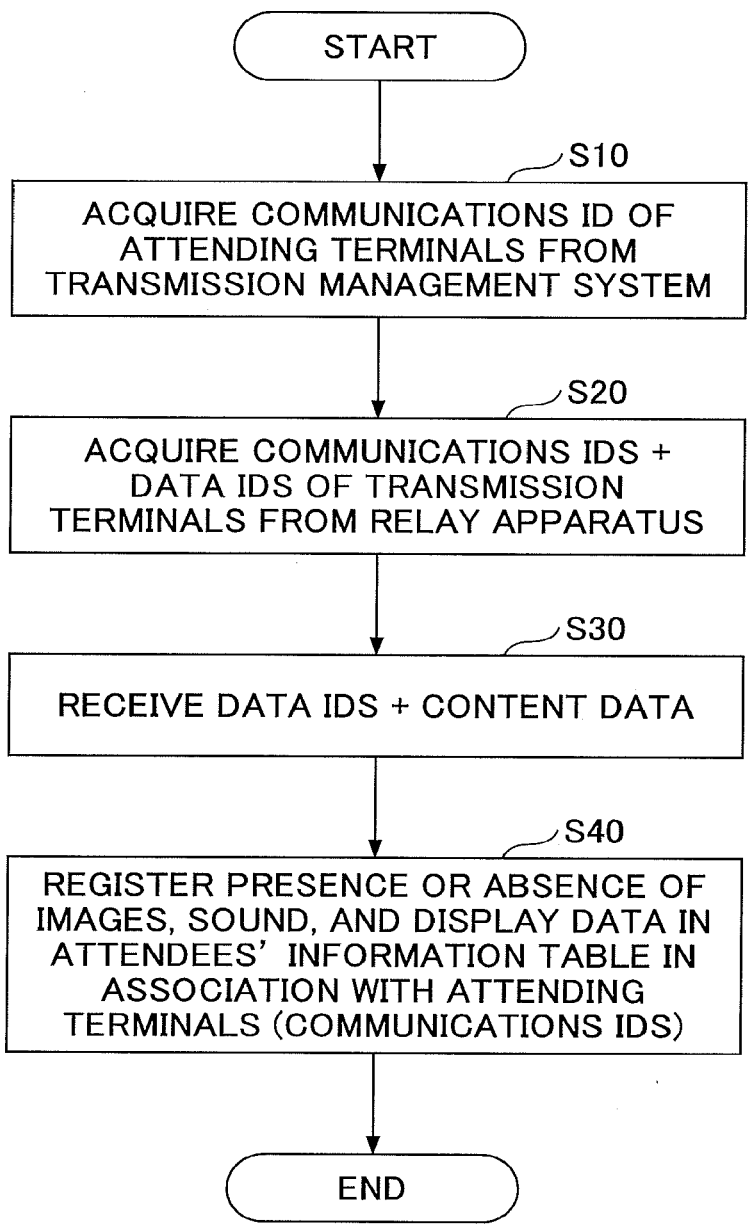
FIG. 9 is a flowchart illustrating a process example of generating an attendees' information table according to the embodiment.

The following describes creation of an attendees' information table with reference to FIG. 9. FIG. 9 is a flowchart illustrating a process example of creating the attendees' information table. The process illustrate in FIG. 9 is executed when the session is established, and the presence or the absence of the content data are changed every time a change occurs.

The attendee information acquisition part 16 acquires the communications IDs of the attending terminals from the transmission management system 50 (step S10). The communications IDs of the attending terminals are registered in the session management table.

Subsequently, the attendee information acquisition part 16 acquires the communications IDs of the transmission terminals 10 in association with the same conference ID from the relay apparatus 30 (step S20). The relay apparatus 30 transmits the communications IDs and the data IDs with respect to the transmission terminals 10 that has not transmitted the content data.

The transmission terminal 10aa receives the data ID and the content data from the transmission terminal 10 that has transmitted the content data via the relay apparatus 30 (step S30).

The attendee information acquisition part 16 determines whether the content data are actually transmitted from the relay apparatus 30 every data ID (i.e., each of image data, the sound data, and the display data) of the transmission terminal 10, and registers the presence or the absence of the image data, the sound data, and the display data in association with the communications IDs (step S40). The attendees' information table is created as a result.

Control of Receiving Content Data

Figure 10:
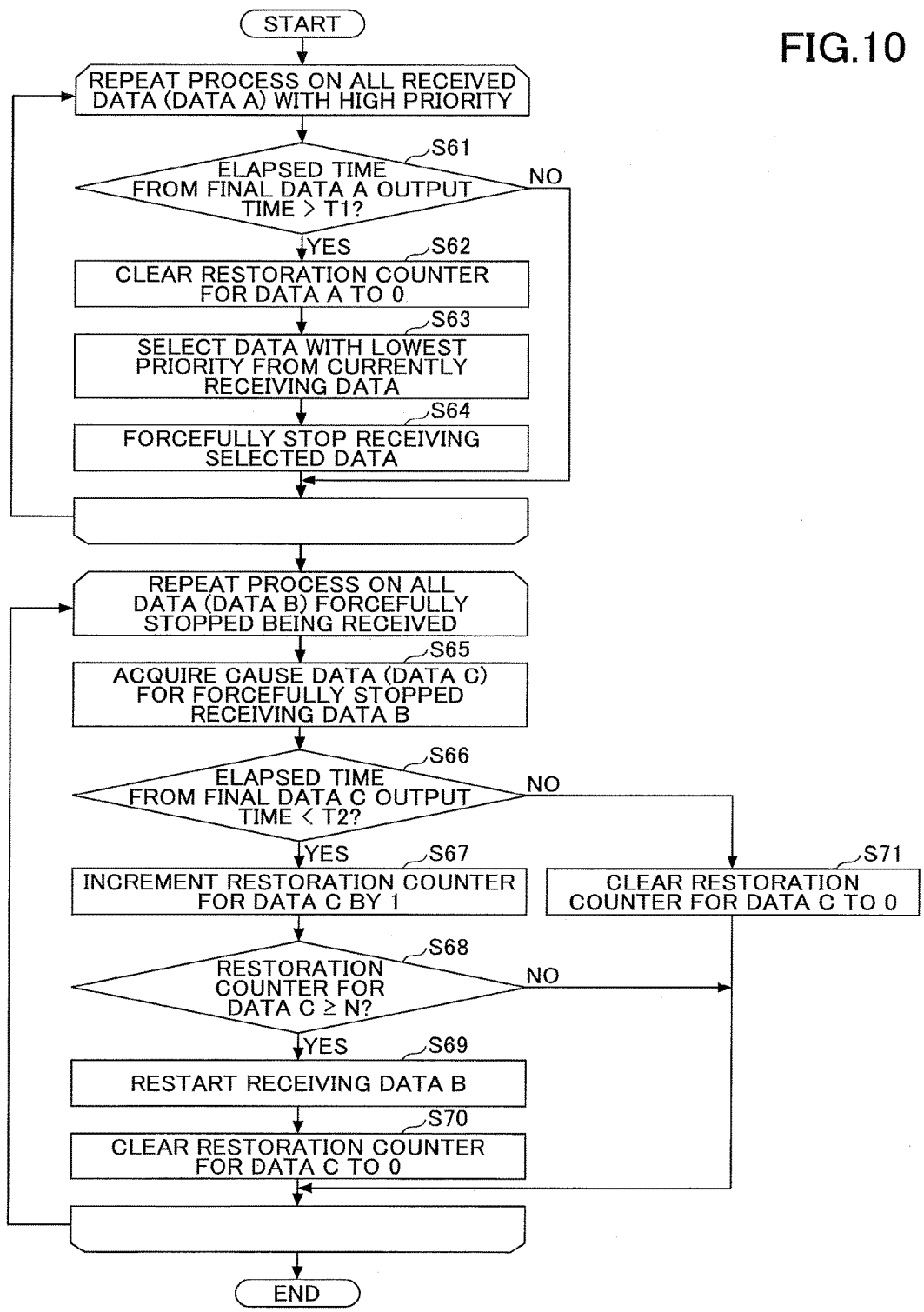
FIG. 10 is a flowchart illustrating a process example of controlling reception of the content data performed by a receiving media controller according to the embodiment.

FIG. 10 is a flowchart illustrating a process example of controlling receiving of the content data performed by the receiving media controller 18. The process of FIG. 10 is repeated while the content data are transmitted or received.

The receiving media controller 18 repeats steps S61 to S64 with respect to all the high priority data IDs having the reception status of "receiving". The high priority data IDs having the "receiving" status indicate the high priority data IDs having values equal to or higher than a predetermined threshold, among the data IDs registered in the receiving priority management table. The content data of the above high priority data IDs are high priority content data (first video data). As illustrated in FIG. 10, the content data of the data IDs corresponding to high priority are received as video data.

For example, the user may determine the high priority range; however, the number of the image data or the number of the display data that exceeds the number of display locations on the conference screen 500 will not be displayed on the conference screen 500. Accordingly, there is little point to determine the number of the high priority levels included in the high priority range to be greater the number of display locations. Thus, the maximum number of high priority levels included in the high priority range may be equal to the number of display locations. In a layout having one of the display locations larger than the rest of the display locations, the high priority level of the data ID corresponding to the large display location may be set at "1". The large image data or display data may be preferentially displayed as a video.

The content data corresponding to the priority levels within the high priority range may be constantly received as videos. The smoothness of the video may depend on the actually receiving bandwidth. When the reception statuses of the content data corresponding to the priority levels within the high priority range are degraded, the content data (second video data) corresponding to priority levels outside the priority range may be stopped being received.

For example, in a case where a condition to determine the high priority is "the priority being 2 or higher", the data ID=RS100 and the data ID=RS002 are handled as the content data corresponding to the high priority. In the following, the content data subject to processing in steps 61 to S64 are referred to as "data A". Performing a process of steps S61 to S64 will stop receiving the content data having the low priority according to the communications status of the data A having the high priority.

In step S61, the receiving media controller 18 compares a time elapsed from a time at which the data A are finally presented to the user with a predetermined time T1. The time at which the data A are finally presented to the user indicates, for example, the time at which the images are displayed on the display 120 last in a case where the data A are the image data. In a case where the data A are the sound data, the time at which the data A are finally presented to the user indicates, for example, the time at which sound is output from the reproducing device including speaker last. The above-described determination may also detect other factors of delay in displaying the images or outputting the sound directed to user including an increase in decrypting process load in addition to the network factor.

The predetermined time T1 may be determined based on a type of the network employed and a processing capacity of the transmission terminal 10. When the network employed is 3G or LTE, the value of the predetermined time T1 may be greater than the value of a wireless LAN. When the network employed is a wired LAN, the value of the predetermined time T1 may be less than the value of the wireless LAN. When the determination in step S61 is NO, the content data corresponding to the data ID having the second highest priority are handled as the data A.

In step S62, when the determination in step S61 is YES, the receiving media controller 18 clears a restoration counter for the data A to 0 because the data A have not been updated for the time exceeding the predetermined time T1. The restoration counter is configured to count a time until the content data set to "forcefully stopped receiving" are restored.

In step S63, the receiving media controller 18 subsequently refers to the receiving priority management table and selects the content data having the lowest priority, among the content data having the reception status "receiving".

In step S64, the receiving media controller 18 performs a forcefully stopped receiving process on the content data selected in step S63. Specifically, the receiving media controller 18 changes the reception status of the content data selected in step S63 into the "forcefully stopped receiving" and records the data ID of the data A in the "reason for having forcefully stopped receiving data" field. The receiving media controller 18 reports to the relay apparatus 30 that the relay apparatus 30 does not need transmitting the content data selected in step S63 to the transmission terminal 10. The relay apparatus 30 stops transferring the content data reported as not needing to be transmitted to the request source terminal. In the above configuration, when updating the content data having the high priority is not progressed in a satisfactory manner, receiving of the content data having the lower priority may be stopped.

As will be described with reference to FIG. 12, the frame data of the content data have been acquired regardless of receiving the content data being stopped. Hence, the content data that has been stopped being received are displayed as static images on the conference screen 500.

The above-described steps S61 to S64 are repeated on the content data of the remaining data ID having the high priority.

After the above-descripted steps S61 to S64 are performed on the content data of all the high priority data ID, the receiving media controller 18 performs the following process on the content data having the reception status "forcefully stopped receiving" in the receiving priority management table. In the following, the content data subject to processing in steps 65 to S71 are referred to as "data B". Performing steps 65 to S71 will restart receiving the content data having reception status "forcefully stopped receiving".

In step S65, the receiving media controller 18 acquires the "reason for having forcefully stopped receiving data" with respect to the data B from the receiving priority management table. In the following, the content data registered in the "reason for having forcefully stopped receiving data B" are referred to as "data C".

In step S66, the receiving media controller 18 calculates an elapsed time from the final output time at which the data C presented to the user last time to the current time. The elapsed time is compared with a predetermined time T2. Specifically, when the elapsed time from the last updated time of data C is short (less than T2), the data C are determined to be updated at satisfactory frequency. Note that the data C correspond to the reason for having forcefully stopped receiving the data B. It is preferable that the predetermined time T2 be sufficiently shorter than the predetermined time T1 in order to facilitate restarting to receive the data B. However, it is mandatory that the predetermined time T2 be longer than an interval in which the transmission terminal 10 transmits the data C so as not to allow the determination in step S66 to be always "YES".

In step S67, when the compared result in step S66 is "YES", the receiving media controller 18 increments a value of the restoration counter for the data C by 1. That is, the data C are transmitted at an appropriate frequency, making it easy to restart receiving the data B.

In step 368, the receiving media controller 18 determines whether the value of the restoration counter is a predetermined value N. The predetermined value N indicates a value to stabilize transition of the screen, and the sufficiently large value may preferably be assigned to the predetermined value N. When the determination in step S68 is "NO", the process is performed on the next content data having the reception status "forcefully stopped receiving data".

In step S69, when the determination in step S68 is "YES", the reception status of the data C is verified to be a predetermined reception level that satisfies an excellent reception status. The receiving media controller 18 thus restarts receiving the data B. That is, the receiving media controller 18 changes the reception status of the data B in the receiving priority management table from "forcefully stopped receiving" to "receiving" to request the relay apparatus 30 to transmit the data B to the transmission terminal 10. The relay apparatus 30 thus restarts transferring the data B to the request source terminal.

In step S70, the receiving media controller 18 clears the restoration counter for the data C to 0. In a case where there are the two or more data B having the reception statuses "forcefully stopped receiving" due to the data C, receiving of such two or more data B having the reception statuses "forcefully stopped receiving" may be restarted in a short period of time, causing the output condition of the content data to the users to be degraded again. However, the above-described process may be able to control such degradation of the output condition.

In step S71, when the compared result in step S66 is "NO", the data C have not been transmitted in a period at least longer than a transmission cycle of the data C. Thus, the receiving media controller 18 clears the value of the restoration counter for the data C to 0.

The above-descripted steps S65 to S71 are repeated on the remaining content data having the reception status "forcefully stopped receiving".

The process illustrated in FIG. 10 may facilitate receiving the content data of the high priority as videos by stopping receiving the content data of the low priority. After the content data of the high priority have been received, receiving the content data of the low priority may be restarted.

Process at Time of Receiving Image Data

Figure 11:
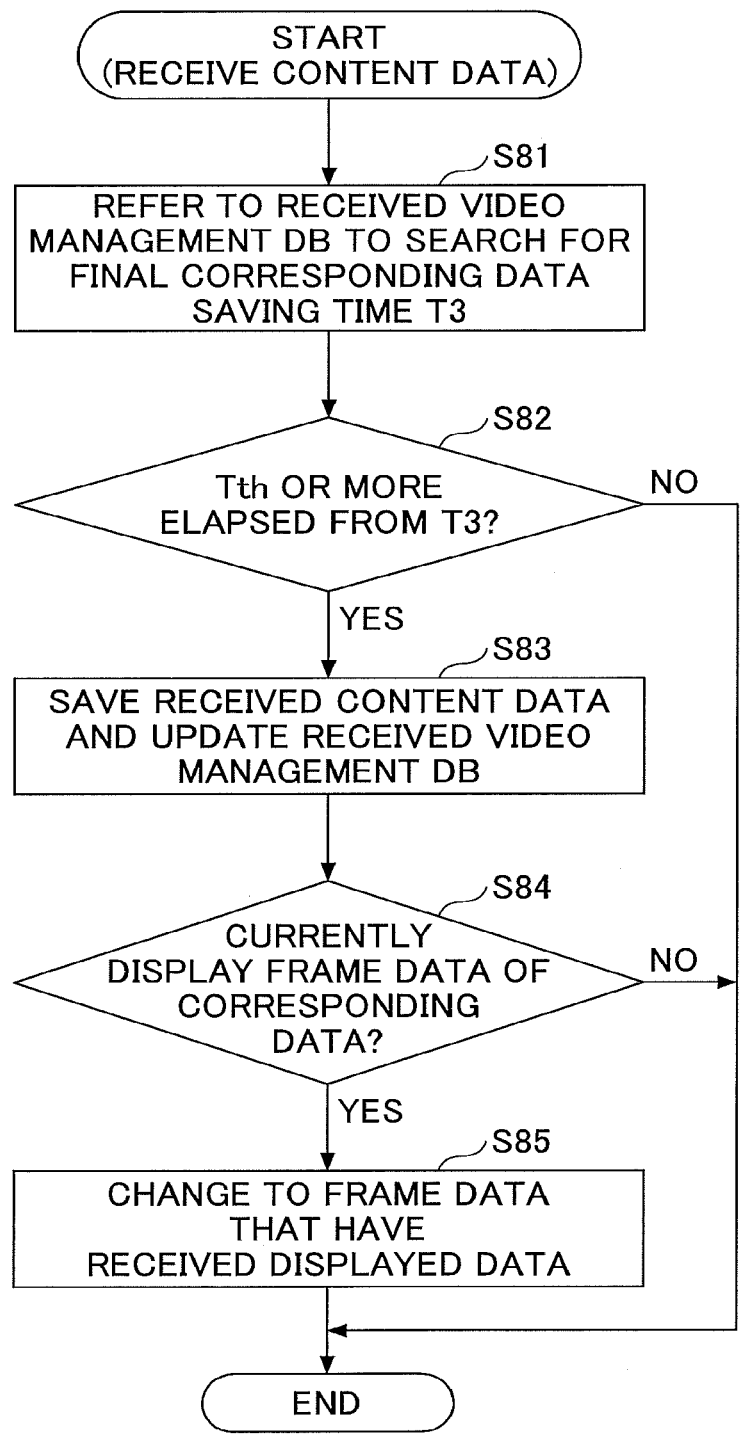
FIG. 11 is a flowchart illustrating a process example of controlling saving of the content data performed by a received video data controller according to the embodiment.

FIG. 11 is a flowchart illustrating a process example of controlling saving of the content data performed by the received video data controller 19. The process of FIG. 11 is repeated while the content data are transmitted or received.

In step S81, the received video data controller 19 searches the received video management table for the received data ID to read the corresponding final saving time T3 from the received video management table.

In step S82, the received video data controller 19 determines whether an elapsed time from the final saving time T3 extracted in step S81 to the current time exceeds a predetermined threshold Tth 1. The Tth 1 is a parameter determined based on the extent to which the load of the content data saving process is allowed. The shorter the Tth 1 is, newer frame data of the content data will be saved and displayed on the display 120. On the other hand, the process load may be increased due to the increased frequency of updating the content data. When the determination result in step S82 is NO, the process of FIG. 11 will end.

In step S83, when the determination result in step S82 is YES, the received video data controller 19 saves the frame data of the content data received by the transmission terminal 10 in the storage 1000 and updates the content of the received video management table.

In step S84, the received video data controller 19 determines whether the frame data of the content data transmitted by the transmission terminal 10 in step S83 are currently displayed. The content data currently displayed as the frame data correspond to the data IDs in the area management table that are in association with the content data having the reception status "stopped receiving" or "forcefully stopped receiving" in the receiving priority management table. When the determination in step S84 is NO, the process of FIG. 11 will end.

In step S85, when the determination in step S84 is YES, the received video data controller 19 updates the currently displayed frame data with the frame data saved in step S83. That is, the frame data that are currently displayed will sequentially be updated with new static images.

Reception Check of Content Data

Figure 12:
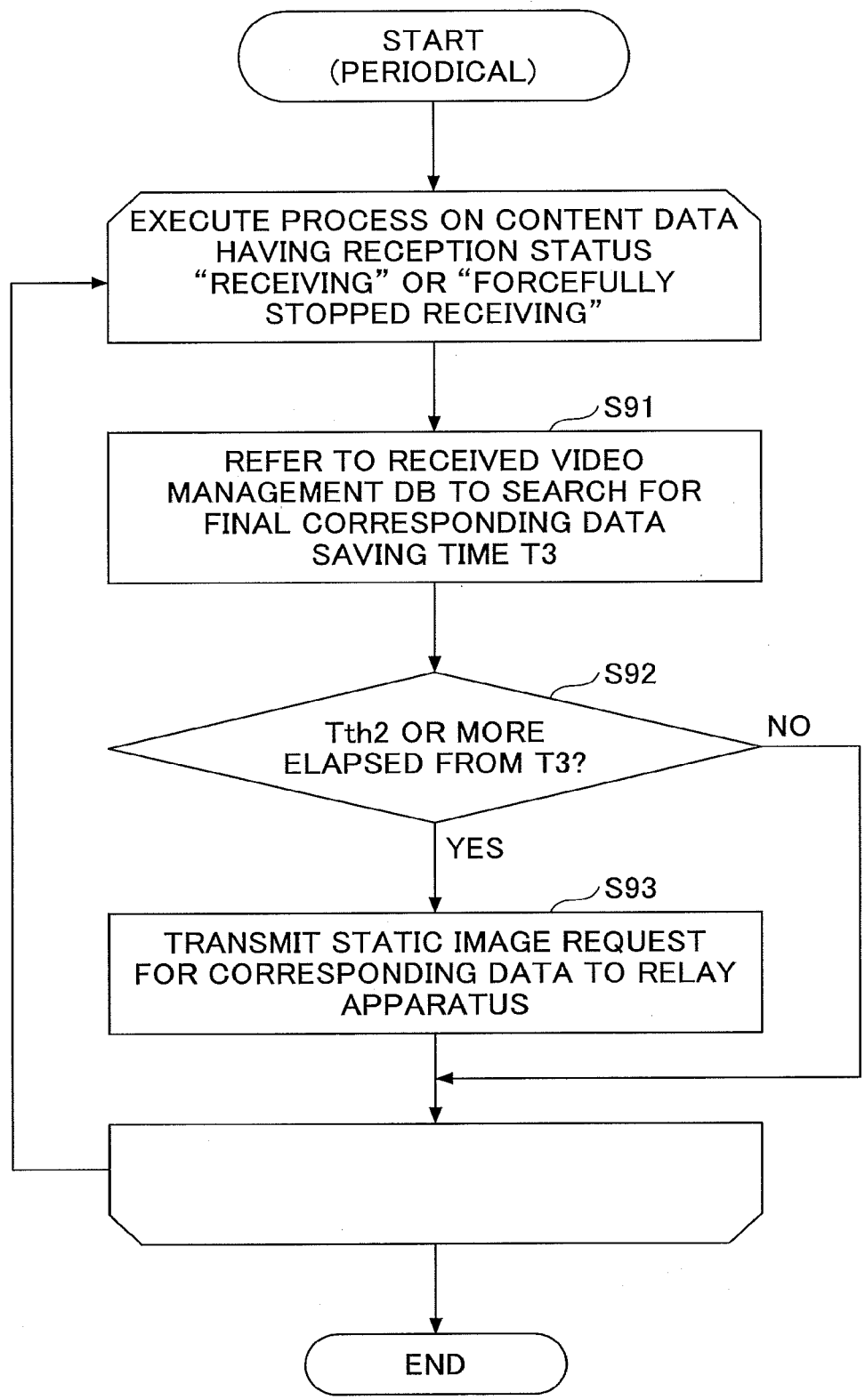
FIG. 12 is a flowchart illustrating a process example performed by the received video data controller to determine whether the content data are received.

FIG. 12 is a flowchart illustrating a process example performed by the received video data controller 19 to determine whether the content data are received. The process of FIG. 12 is executed at predetermined time intervals during the conference.

The following steps S91 to S93 are sequentially executed on all the content data shared in the attended conference, regardless of the content data being displayed on the conference screen 500.

In step S91, the received video data controller 19 refers to the received video management table to extract final stored times in association with the content data subject to processing.

In step S92, the received video data controller 19 determines whether a time elapsed from the final stored time to the present time is greater than or equal to a predetermined threshold Tth 2. Whether the saved frame data are older than the allowable elapsed time range is determined based on the determination in step S92. The threshold Tth 2 is determined in response to the allowable network bandwidth degradation. The update request is more frequently transmitted as the threshold Tth 2 is decreased in order to constantly maintain new frame data; however, the network bandwidth will be degraded along with the update request transmission frequency. The threshold Tth 2 may thus be greater than the threshold Tth 1. For example, when the threshold Tth 1 is 1 min., the threshold Tth 2 is 5 min. When the determination in step S92 is NO, the process on the subject content data is ended and the process on the remaining content data is continued.

In step S93, when the determination in step S92 is YES, the received video data controller 19 transmits a request for transmitting the content data to the relay apparatus 30 in order to update the frame data of the content data. Accordingly, the frame data may be updated when the time elapsed from the final stored time to the present time exceeds the threshold Tth 2.

The process on the remaining content data is continued thereafter. When the transmission terminal 10 directly communicates with another transmission terminal 10 without the intervention of the relay apparatus 30, the transmission terminal 10 directly transmits the request for transmitting the content data to another transmission terminal 10 that outputs the corresponding content data.

As illustrated above, the frame data are stored in the transmission terminal 10 even when the video data are not received in addition to the frame data that are stored when the video data are received. Accordingly, the newest frame data may be displayed even when the video data are replaced with the frame data.

Transmission and Reception of Frame Data

Figure 13:
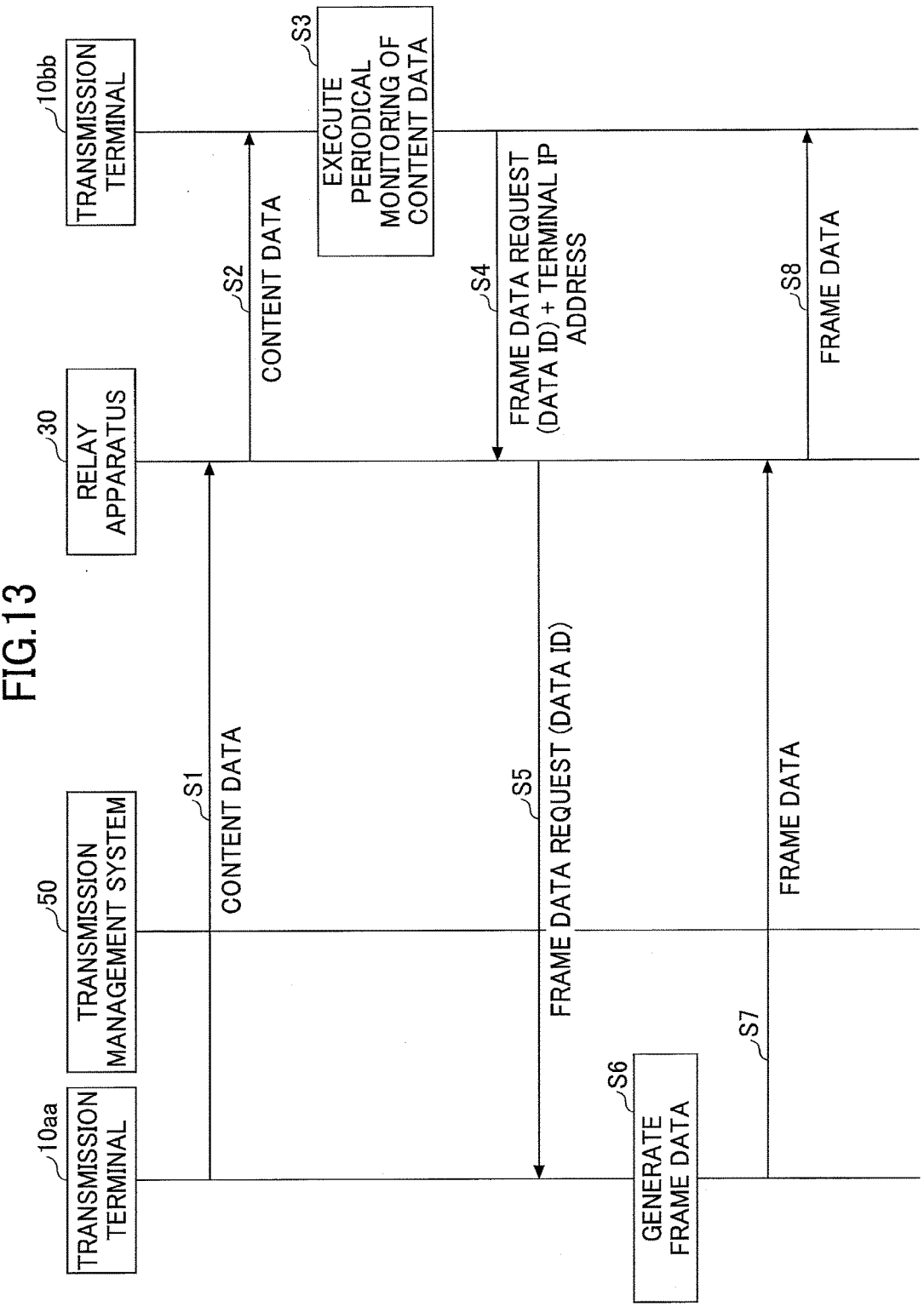
FIG. 13 is a sequence diagram illustrating a process example of transmission and reception of frame data requested in the process of FIG. 12.

FIG. 13 is a sequence diagram illustrating an example of transmission and reception process of the frame data requested in the process of FIG. 12.

In steps S1 and S2, the content data transmitted from the transmission terminal 10*aa* are transferred to the transmission terminal 10*bb* via the relay apparatus 30, as already described above.

In step 33, the transmission terminal 10*bb* periodically monitors the content data illustrated in FIG. 12. For illustrating further in detail, it is assumed that the content data from the transmission terminal 10*aa* do not reach the transmission terminal 10*bb* for a long period.

In step S4, the received video data controller 19 of the transmission terminal 10*bb* transmits a frame data request via the relay apparatus 30 to the transmission terminal 10*aa* by specifying the IP address and the data ID of the transmission terminal 10*aa*.

In step S5, the relay apparatus 30 that has received the frame data request transmits the frame data request to the transmission terminal 10*aa*.

In step S6, the transmission terminal 10*aa* that has received the frame data request generates the frame data of the image data or the display data via an imager 22.

In step S7, the transmission terminal 10*aa* transmits the generated frame data to the relay apparatus 30.

In step S8, the relay apparatus 30 that has received the generated frame data transfers the frame data to the transmission terminal 10*bb* of the request source terminal.

In step 39, the received video data controller 19 of the transmission terminal 10*bb* that has received the frame data executes the process illustrated in FIG. 12 and updates the frame data managed in the receiving priority management table.

FIG. 13 illustrates an example of the process performed by the relay apparatus 30 that sequentially transmits the frame data request to the transmission terminal 10*aa* of the transmission source of the content data in response to the frame data request from the transmission terminal 10*bb*. However, the relay apparatus 30 may save the frame data of the content data in order to transfer the saved frame data to the request source terminal when the relay apparatus 30 receives the frame data request from the transmission terminal 10*bb*. The relay apparatus 30 sufficiently monitors the new frame data to transfer the new frame data to the request source terminal. That is, the relay apparatus 30 generates the frame data from the content data received from each of the transmission terminals 10 and periodically saves the generated frame data.

The network bandwidth used for transferring the frame data in steps S7 and S8 of FIG. 13 may be controlled to have lowered network bandwidth. The frame data may thus be received without substantially affecting other network communications.

Display Process of Conference Screen

Figure 14:
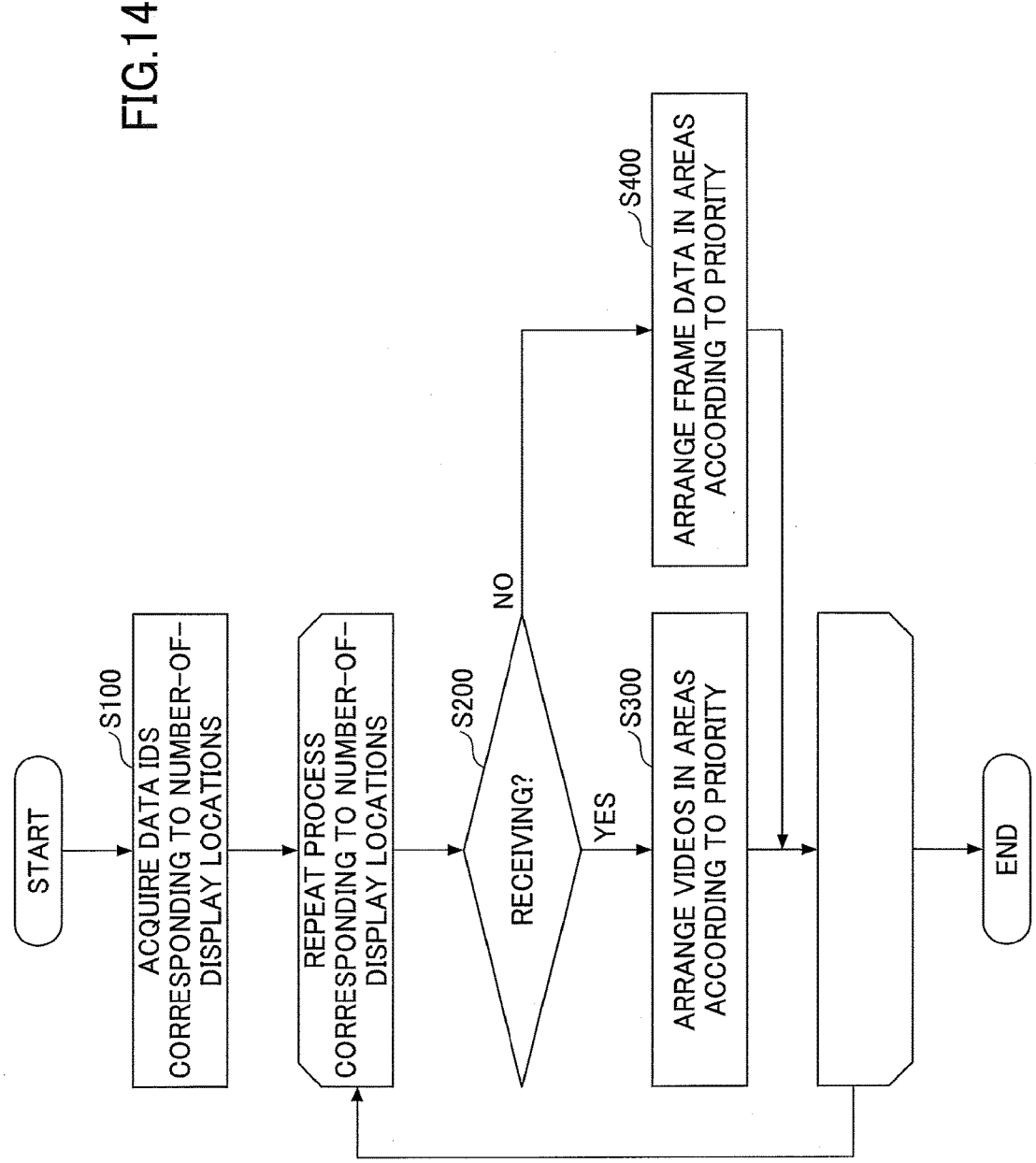
FIG. 14 is a flowchart illustrating a process example of displaying a conference screen performed by the transmission terminal according to the embodiment.

FIG. 14 is a flowchart illustrating a process performed by the transmission terminal 10 to display the conference screen 500. The process of FIG. 14 is repeatedly conducted approximately with the same period as the reception stop process of FIG. 10.

The display controller 23 reads the data IDs corresponding to the number of the display locations from the receiving priority management table (step S100).

The process from step S200 to step S400 is repeated the number of the data IDs read in step S100.

The display controller 23 determines whether the reception status of the data ID detected from the receiving priority management table is "receiving" (step S200).

When the determination in step S200 is YES, the display controller 23 arranges the videos in the areas determined in accordance with the priority (step S300).

When the determination in step S200 is NO, the display controller 23 arranges the frame data in the areas determined in accordance with the priority (step S400).

The above-described process may display the videos or the frame data in respective areas of the conference screen 500.

Screen Transition Example

FIGS. 15A to 15D are diagrams illustrating examples of screen transitions of the conference screen 500 displayed on the transmission terminal 10. FIGS. 15A to 15D illustrating examples of the priority range being "1".

The arrangement and the number of areas of the conference screen 500 are predetermined, regardless of the number of content data received based on the network bandwidth condition.

Figure 15B:
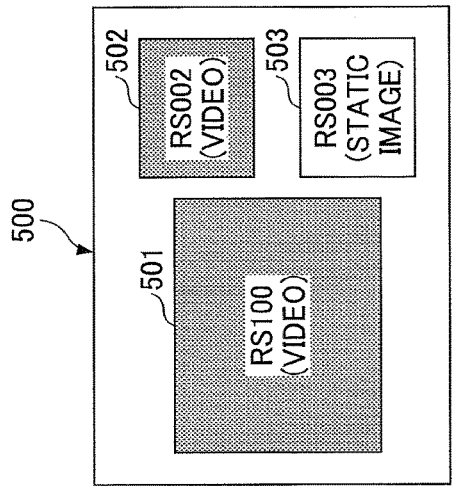
FIGS. 15A to 15D are diagrams illustrating examples of screen switching of the conference screen displayed on the transmission terminal according to the embodiment.
Figure 15D:
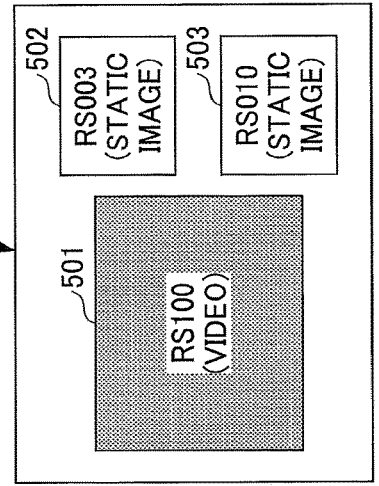
Figure 15A:
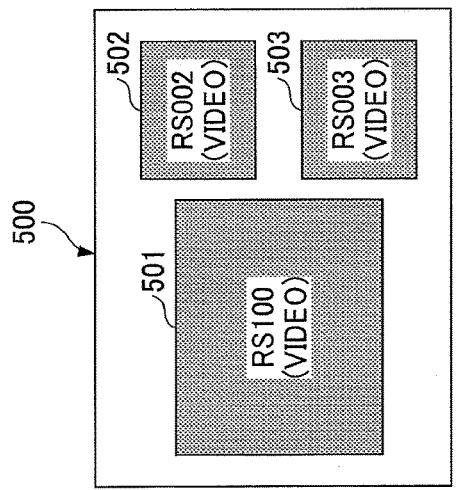

FIG. 15A illustrates a condition in which all the image data or display data in association with the data IDs of RS100, RS002, and RS003 are received as video data. Thereafter, the receiving media controller 18 has determined to stop receiving the image data of RS003 according to degradation of the network bandwidth.

As illustrated in FIG. 15B, the display controller 23 displays in the area 503 the frame data stored in association with RS003 in the received video management table instead of the video data. The layout of the conference screen 500 remains unchanged in transition from the conference screen 500 in FIG. 15A to the conference screen 500 in FIG. 15B, which may prevent the users from being annoyed as well as displaying the conference screen 500 in an excellent condition with respect to the network bandwidth.

Subsequently, it is assumed that the receiving priority management table is changed such that the priority of RS010 is set higher than the priority of RS003. The priority may be changed by the user's operation to change the priority or may be changed according to a change of a speaker.

In a case where the network bandwidth remains unchanged, the image data received by the transmission terminal 10 as video data are the image data of RS100 and RS002. Thus, the image data of RS100 and RS002 are continuously displayed as video data.

Figure 15C:
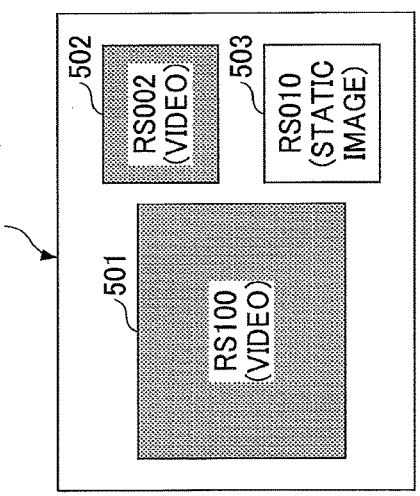

However, since the priority of RS010 now is higher than the priority of RS003, the display controller 23 displays the frame data of RS010 in the area 503 in which the frame data of RS003 have been displayed as illustrated in FIG. 15C. The display controller 23 detects RS010 having the third priority from the receiving priority management table and reads the frame data in association with RS010 from the received video management table. As already described with reference to FIGS. 11 to 13, the frame data are updated at the threshold Tth 2. In a case where the locations not displayed on the conference screen 500 may later have higher priorities and be displayed on the conference screen 500, the displayed frame data will be sufficiently new.

Next, it is assumed that the receiving media controller 18 has determined to stop receiving the image data of RS002 due to a degraded network bandwidth. It is also assumed that the priority of the content data is also changed such that the priority of RS002 is lowered and the priority of RS003 is raised.

As illustrated in FIG. 15D, the display controller 23 reads the frame data in association with RS003 from the received video management table. There is no change in the priority of RS010. Even in such case, the overall layout remains unchanged as illustrated in FIG. 15D, the video data of RS100 having the highest priority continue being displayed with respect to the users. The display position of the already displayed image data (frame data) of RS010 remains unchanged, and the frame data of RS003 having the raised priority are displayed in the area 502.

The image data (video data) of RS100 having the highest priority thus continue being displayed as video data in the largest area 501. In this case, the layout of the conference screen 500 remains unchanged despite the content data having stopped being received due to the change in the network bandwidth. Accordingly, the users who attend to the video data of RS100 will not need changing directions of the users eyes. The users may thus be prevented from being annoyed. The layout of the frame data of RS003 and RS010 also remains unchanged, allowing the users to little feel being annoyed. The frame data to be displayed are constantly undated despite the network bandwidth being degraded, allowing the latest content data of the locations to be displayed. Even if the frame data are switched from the video data, the frame data are constantly updated with the latest version. Hence, the latest frame data may be displayed.

Note that the examples of the conference screen 500 illustrated in FIGS. 15A to 15D do not include content data of an own location; however, the content data of the own location may be displayed a predetermined area of the conference screen 500. The content data of the own location may be displayed in the area 503 (the number of display locations will be two in this case), or a fourth area may be formed in the conference screen 500 in the examples of FIGS. 15A to 15D.

Other Embodiments

The preferred embodiments and examples are described above; however, the present disclosure is not limited to the above-described embodiments and examples. Various alteration and modification may be made within the scope without departing from the gist of the present disclosure.

For example, in the above-described embodiments, the transmission terminals 10 perform communications via the relay apparatus 30; however, the transmission terminals 10 may perform communications without intervention of the relay apparatus 30. A web read-time communication (Web RTC) is known in the art as a communications protocol of the above-described communications. With the Web RTC, the number of display locations may also be determined according to the reception bandwidth.

The transmission management system 50, the transmission terminal 10, and the relay apparatus 30 in FIG. 6 are illustrated with main functions for aiding the understanding of the processes performed by the transmission management system 50 and the transmission terminal 10. However, the present embodiments are not limited to the main functions that are divided based on the process units or names of the process units. The processes of the transmission management system 50 and the transmission terminal 10 may further be divided into a large number of process units in accordance with the process content. The process of the transmission management system 50 or the transmission terminal 10 may be divided to allow each of the process units to further include a large number of processes.

In the above embodiments, the transmission management system 50 and the relay apparatus 30 are separately illustrated; however, an apparatus may have integrated functions of both the transmission management system 50 and the relay apparatus 30.

The transmission system 1 may include the transmission management system 50, and the functions of the transmission management system 50 may be disposed decentrally in one or more servers.

One or more databases held in the storage 5000 by the transmission management system 50 may be located over the communications network. Similarly, one or more databases held in the storage 1000 by the transmission terminal 10 may be located over the communications network.

In the above-described embodiments, the display 120 is given as the display device; however, the display device may be any device capable of displaying images. Examples of such a display device include a projector a head-up display (HUD), a television receiver, and a car navigation terminal.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, including the Internet. The processing apparatuses can comprise any suitably programmed apparatuses including a general purpose computer, personal digital assistant, mobile telephone (including a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code including a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

According to embodiments, there is provided an information processing apparatus, an image display method, and a communications system capable of controlling frequent switching of the layout of a screen.

The present invention is not limited to the specifically disclosed embodiments, and variations and modifications may be made without departing from the scope of the present invention.

What is claimed is:

1. An information processing apparatus for displaying, on a screen with one or more areas, video data received via a network from one or more other information processing apparatuses, the information processing apparatus comprising:
   a receiver configured to receive the video data from the one or more other information processing apparatuses;
   circuitry configured to determine a number of the video data to be displayed in the one or more areas of the screen according to a communications status, the video data being received from the one or more other information processing apparatuses;
   a static image data storage configured to store static image data of the video data to be displayed in the one or more areas of the screen when the receiver receives the video data; and
   a display processor configured to display the static image data in the one or more areas of the screen in a case where the number of the video data determined by the circuitry is less than a number of the areas of the screen,
   wherein the static image data storage acquires from the one or more other information processing apparatuses the static image data to store the acquired static image data in the static image data storage in response to a determination that a predetermined time has elapsed since the static image data was previously acquired, and
   wherein in a case where the static image data acquired by the static image data storage from the one or more other information processing apparatuses are displayed in the areas of the screen, the display processor updates the static image data displayed in the areas of the screen with a latest version of the static image data acquired by the static image data storage.

2. The information processing apparatus according to claim 1,
   wherein the static image data storage acquires the static image data from the one or more other information processing apparatuses, from some of which the receiver has not received the video data, and the static image data storage stores the acquired static image data in the static image data storage, and
   wherein in a case where the circuitry has determined not to receive the video data, the display processor displays the static image data in the areas instead of the video data that the circuitry has determined not to receive, the static image data being acquired from the one or more other information processing apparatuses from which the receiver has not received the video data.

3. The information processing apparatus according to claim 2,
   wherein the display processor refers to priority information registering priorities of the video data transmitted by the one or more other information processing apparatuses to display one of the video data and the static image data in the areas of the screen in descending order of priority of the video data such that the displayed number of a corresponding one of the video data and the static image data matches the number of the areas of the screen, and wherein in a case where the priority of the video data that the receiver has not received is changed to be equal to or higher than the priority of the displayed one of the video data and the static image data displayed in the areas of the screen, the display processor displays the static image data in the areas of the screen according to the priority, the static image data having been acquired by the static image data storage from the one or more other information processing apparatuses that have not transmitted the video data.

4. The information processing apparatus according to claim 3,
wherein in a case where a reception status of first video data having a priority equal to or higher than a threshold is degraded, the circuitry stops receiving second video data having a priority lower than the threshold.

5. The information processing apparatus according to claim 4,
wherein in a case where the second video data stops being received, the display processor displays one of the video data and the static image data in descending order of priority of the video data in the areas of the screen according to the priorities of the displayed one of the video data and the static image data without changing the number of the areas of the screen.

6. The information processing apparatus according to claim 4,
wherein the circuitry records identification information of the first video data in the priority information in association with the second video data that has stopped being received due to the first video data having the priority equal to or higher than the threshold, and
wherein in a case where the circuitry verifies that the reception status of the first video data is a predetermined reception level that satisfies an excellent reception status, the circuitry restarts receiving the second video data.

7. A method for displaying, on a screen with one or more areas, video data received via a network from one or more other information processing apparatuses, the method being implemented by an information processing apparatus, the method comprising:
receiving the video data from the one or more other information apparatuses;
determining a number of the video data to be displayed in the one or more areas of the screen according to a communications status, the video data being received from the one or more other information processing apparatuses;
storing static image data of the video data to be displayed in the one or more areas of the screen when the receiver receives the video data; and
displaying the static image data in the one or more areas of the screen in a case where the determined number of the video data is less than a number of the areas of the screen,
wherein the storing the static image data includes acquiring from the one or more other information processing apparatuses the static image data to store the acquired static image data in response to a determination that a predetermined time has elapsed since the static image data was previously acquired, and
wherein in a case where the acquired static image data from the one or more other information processing apparatuses are displayed in the areas of the screen, the displaying includes updating the static image data displayed in the areas of the screen with a latest version of the acquired static image data.

8. A communications system comprising:
a first information processing apparatus configured to receive video data to display the received video data on a screen with one or more areas; and
one or more second information processing apparatuses configured to transmit the video data to the first information processing apparatus via a network, the first information processing apparatus including
a receiver configured to receive the video data from the second information apparatuses;
circuitry configured to determine a number of the video data to be displayed in the one or more areas of the screen according to a communications status, the video data being received from the second information apparatuses;
a static image data storage configured to store static image data of the video data to be displayed in the one or more areas of the screen when the receiver receives the video data; and
a display processor configured to display the static image data in the one or more areas of the screen in a case where the number of the video data determined by the circuitry is less than a number of the areas of the screen,
wherein the static image data storage acquires from the one or more second information processing apparatuses the static image data to store the acquired static image data in the static image data storage in response to a determination that a predetermined time has elapsed since the static image data was previously acquired, and
wherein in a case where the static image data acquired by the static image data storage from the one or more second information processing apparatuses are displayed in the areas of the screen, the display processor updates the static image data displayed in the areas of the screen with a latest version of the static image data acquired by the static image data storage.

* * * * *